(12) United States Patent
Desjardins et al.

(10) Patent No.: US 8,121,902 B1
(45) Date of Patent: Feb. 21, 2012

(54) CUSTOMER-ANNOTATED CATALOG PAGES

(75) Inventors: Chad Desjardins, Seattle, WA (US); Russell A. Dicker, Seattle, WA (US); Brian Goldstein, Seattle, WA (US); Maurice Codik Moscoso, Seattle, WA (US); Joseph A. Frisbie, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1126 days.

(21) Appl. No.: 11/782,633

(22) Filed: Jul. 24, 2007

(51) Int. Cl.
*G06Q 30/00* (2006.01)
(52) U.S. Cl. .................................................. 705/26.1
(58) Field of Classification Search ............ 705/26, 705/27, 26.1
See application file for complete search history.

(56) References Cited

U.S. PATENT DOCUMENTS

| | | | |
|---|---|---|---|
| 6,070,167 A | 5/2000 | Qian et al. | |
| 7,668,821 B1 | 2/2010 | Donsbach et al. | |
| 2002/0010625 A1 | 1/2002 | Smith et al. | |
| 2002/0103813 A1 | 8/2002 | Frigon | |
| 2003/0105682 A1 | 6/2003 | Dicker et al. | |
| 2004/0148366 A1* | 7/2004 | Ross et al. | 709/218 |
| 2005/0009078 A1* | 1/2005 | Craford et al. | 435/6 |
| 2005/0097007 A1* | 5/2005 | Alger et al. | 705/26 |
| 2007/0005571 A1 | 1/2007 | Brewer et al. | |
| 2007/0078832 A1 | 4/2007 | Ott et al. | |
| 2007/0219964 A1 | 9/2007 | Cannon et al. | |
| 2007/0226077 A1 | 9/2007 | Frank et al. | |
| 2008/0021928 A1 | 1/2008 | Yagnik | |
| 2008/0065995 A1 | 3/2008 | Bell et al. | |
| 2008/0082486 A1 | 4/2008 | Lermant et al. | |
| 2008/0091549 A1 | 4/2008 | Chang et al. | |
| 2008/0189336 A1 | 8/2008 | Prihodko | |
| 2008/0281684 A1 | 11/2008 | Stefanik et al. | |
| 2009/0077062 A1 | 3/2009 | Spivack et al. | |

OTHER PUBLICATIONS

Business/Technology Editors, Business Wire. New York: Jun 8, 1999. p. 1; Introducing IShopHere—The World's Fastest and Easiest Way to Shop Online; http://proquest.umi.com/pqdweb?did=42217221&sid=9&Fmt=3&clientId=19649&RQT=309&VName=PQD.*

U.S. Appl. No. 11/954,971, filed on Dec. 12, 2007, Desjardins, et al., "Surfacing Related User-Provided Content".

U.S. Appl. No. 12/200,822, filed on Aug. 28, 2008, Agarwal, et al., "Enhancing and Storing Data for Recall and Use".

U.S. Appl. No. 12/203,634, filed on Sep. 3, 2008, Gulten, et al., "Facilitating Review of Products Considered for Purchase".

U.S. Appl. No. 12/415,479, filed on Mar. 31, 2009, Endresen, "Acquiring Multiple Items in an Image".

(Continued)

*Primary Examiner* — Mila Airapetian
(74) *Attorney, Agent, or Firm* — Lee & Hayes, PLLC

(57) ABSTRACT

Customer-annotated catalog pages enable a user of a merchant website to annotate an image that illustrates one or more items found within an electronic catalog. This annotation may include associating an illustrated item with a hyperlink to a page that is associated with the illustrated item. This annotation may also include commenting on the illustrated item or describing the image as a whole. In some instances, the user may herself upload the image to the merchant web site to enable this annotation. Additionally, other users of the merchant website may comment on the image, the illustrated items, or may associate hyperlinks to associated pages for one or more of the illustrated items. By providing such customer-annotated catalog pages, users of the merchant website are able to view a group of potentially-related items and are able to easily navigate to these items' associated pages within the electronic catalog or otherwise.

58 Claims, 17 Drawing Sheets

OTHER PUBLICATIONS

Blog at WordPress.com, "H&M Virtual Dressing Room", retrieved on Jun. 12, 2008, 2 pgs.

Dogma London Virtual Dressing Room, retrieved on Jun. 12, 2008 at <<http://www.dogmalondon.com/dressing.html>>, Dogma London, Inc., 2006, 2 pgs.

"H&M—Dressing Room", retrieved on Mar. 4, 2009 at <<http://www.hm.com/gb/inspiration/dressingroom_dressingroom2.nhtml>>H&M Hennes Ltd., Copyright H & M Hennes & Mauritz AB 2007, 1 pg.

KnickerPicker The Online Dressing Room, retrieved on Jun. 12, 2008 at <<http://www.knickerpicker.com/dressing-room.asp?results=27&Type=Brand&BNm=La%20Senza>>, KnickerPicker, Ltd., 2008, 1 pg.

My Virtual Model—Virtual Dressing Room, retrieved on Jun. 12, 2008 at <<http://www.mvm.com/en/solutions.htm>>, My Virtual Model Inc., (2001-2006), 4 pgs.

Score American Soccer Virtual Dressing Room, retrieved on Jun. 12, 2008 at <<http://www.scoresports.com/vdr.php>>, Score American Soccer Company, Inc., 2007-2008, 2 pgs.

Mukherjea, et al., "AMORE: A World Wide Web Image Retrieval Engine", Baltzer World Wide Web (online). vol. 2, No. 3, 1999, retrieved from the internet at http://www.springerlink.com/content/v257668q1jm0862h/fulltext.pdf on Sep. 11, 2010, pp. 115-132.

"Facebook Photos Infrastructure", The Facebook Blog, retrieved on Jul. 11, 2011 at <<http://blog.facebook.com/blog.php?post=2406207130>>, 2 pages.

"How to tag photos in Facebook", eHow.com, retrieved on Jul. 11, 2011 at <<http://www.ehow.com/how_4816174_tag-photos-facebook.html, 2 pages.

Office action for U.S. Appl. No. 12/415,479, mailed on Jun. 24, 2011, Endresen, "Acquiring Multiple Items in an Image", 18 pages.

Non-Final Office Action for U.S. Appl. No. 11/782,633, mailed on May 13, 2011, Chad Desjardins, "Customer Catalogs-Annotated Guides".

* cited by examiner

CUSTOMER-ANNOTATED CATALOG PAGES

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in locating a desired product from among hundreds or thousands of offered products. For novice customers, meanwhile, the task of shopping online via the web can be unproductive and even frustrating.

In response to these difficulties, these companies continually strive to make their e-commerce websites more dynamic, compelling, and easier for users to navigate and locate products. To help meet these goals, these companies endeavor to not only simplify a customer's experience in locating a particular product, but also endeavor to simplify a customer's experience in locating relating products. For instance, if a topic of "fitness" interests a particular customer, then an e-commerce company typically desires to display to the particular customer a variety of related products that relate to this topic.

One recent innovation allows customers to search for a product by tags associated with that product. Tags essentially enable customers, the e-commerce company, or some other entity the ability to easily categorize products. For instance, a customer who has purchased a certain fitness-related book may tag this book as relating to "fitness". When the particular customer discussed above then conducts a tag search based on "fitness", this book will appear in a returned listing of products along with other related products. While tagging and other recent innovations have proven very successful, e-commerce companies continue to explore techniques to enable customers to more easily locate related products.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 6 illustrates a screen rendering of an illustrative catalog search page that enables a user of a merchant website to search for customer-annotated catalog pages by topics, items, or the like.

DETAILED DESCRIPTION

Embodiments of the present disclosure are directed to, among others, enabling users to annotate an image as well as elements illustrated in the image. As an overview, elements may be a product, a service, a sellable unit, a user profile, customer-created content (e.g., artwork), or anything else that an image may somehow illustrate. Annotating, meanwhile, may include commenting on the image, commenting on elements illustrated in the image, or associating hyperlinks to web pages associated with the illustrated elements, among other possibilities. With use of these annotations, a particular user may create a catalog page that is made available to other users over a network such as the Internet. These other users may then further annotate this catalog page or comment on the existing annotations. In addition to enabling further annotations, making this page available over the network enables these other users to view potentially-related elements that together appear in the image.

In some instances, a user uploads to a website an image that illustrates one or more elements. In other instances, an operator of the website provides the image. The user, another user of the website, the website operator, or some other entity then describes the scene that the image generally illustrates. In addition, one or more of these actors describe or comment upon an element within the image. In instances where the image contains an element listed in an electronic catalog, one or more of these actors associates the illustrated element with a link to the element within the electronic catalog. Therefore, the image may display this link or some other metadata relating to the element when a user's cursor hovers over the illustrated element in the image. If the user selects (e.g., clicks on) the element or the displayed link, then the website serves a webpage that corresponds to the element within the electronic catalog. If the image illustrates multiple elements within the electronic catalog, then each of these elements may be similarly associated with a link to a respective element within the electronic catalog.

For purposes of discussion, customer-annotated catalog pages are described in the context of an item catalog hosted by a merchant website. One illustrative implementation of this environment is provided below. However, it should be appreciated that the described catalog pages and associated techniques may be implemented in other environments.

Illustrative System Architecture

Figure 1:
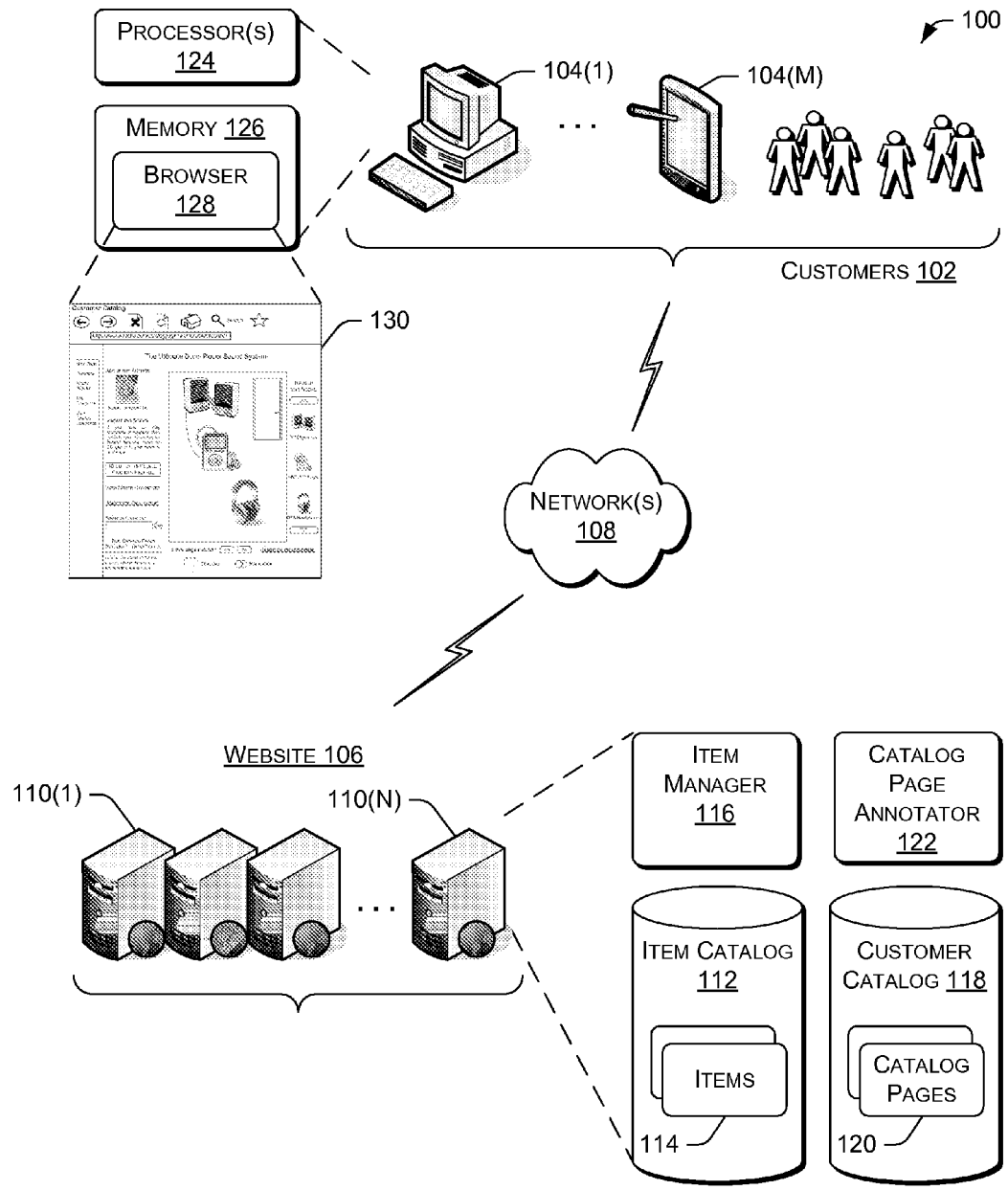
FIG. 1 illustrates an illustrative architecture for implementing customer-annotated catalog pages. The architecture includes multiple clients coupled via a network to a server system that hosts an electronic catalog as well as a customer catalog.

FIG. 1 illustrates an illustrative architecture 100 in which customer-annotated catalog pages may be implemented. In architecture 100, one or more customers 102 utilize computing devices 104(1), ..., (M) to access a website 106 via a network 108. Network 108 represents any one or a combination of multiple different types of networks, such as cable networks, the Internet, and wireless networks.

One or more servers 110(1), ..., 110(N), perhaps arranged in a cluster or as a server farm, host website 106. Other server architectures may also be used to host the site. Website 106 is capable of handling requests from many users and serving, in response, various web pages that can be rendered at user computing devices 104(1)-(M). Website 106 can be any type of website that supports user interaction, including online retailers, informational sites, social networking sites, blog sites, search engine sites, news and entertainment sites, and so forth.

In the illustrative environment, website 106 represents a merchant website that hosts an electronic catalog with one or more items. An item includes anything that the merchant wishes to offer for purchase, rental, subscription, viewing, informative purposes or some other form of consumption. In some embodiments the item may be offered for consumption by the merchant. However, in some embodiments the merchant may host items that others are selling using the merchant's website. An item can include a product, a service, a digital download, a news clip, customer-created content (e.g., a customer review), information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Each item record 114, meanwhile, represents an associated item, which may be offered for sale on website 106, and contains information about the associated item. For products such as books or music CDs, for example, the item record may contain a description, images of the product, author/artist names, publication data, pricing, shipping information, and so forth. For other types of items, the item record may contain different information appropriate for those items.

An item manager 116 facilitates access to and management of item records 114 in item catalog 112. Item manager 116 allows the website operators to add or remove items to item catalog 112, and generally maintain control of the items offered on website 106. When a user requests information on an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

In addition, each item record 114 within item catalog 112 may be associated with multiple pages, such as an item review page, an item detail page, and the like. The item detail page displays metadata about the particular item and stored within items records 114. This metadata may include the item's name, manufacturer, specifications, price, availability, and the like. Imagine, for instance, that one of customers 102 searches item catalog 112 for a particular item via a search tool. Website 106 would serve, to one of computing devices 104(1)-(M), a webpage that lists items that match the search criteria. If the customer selects (e.g., clicks on) one of the returned items, then website 106 likely serves the item's item detail page to the computing device.

Web servers 110(1)-(N) also include and/or can access a customer catalog 118, which itself includes one or more customer catalog pages 120. Customer catalog 118 may group catalog pages 120 according to categories. For instance, each of a group of catalog pages 120 that relate to home and garden activities may be indexed under "Home and Garden". In some instances, customers 102 may create some or all of these categories and may index some or all of catalog pages 120 within these categories. In other instances, web servers 110(1)-(N) analyze some or all of catalog pages 120 to determine a proper category in which to index the pages.

As illustrated, web servers 110(1)-(N) also include a catalog page annotator 122 to enable customers 102, an operator of website 106, or some other entity to create and/or annotate customer catalog pages 120. Customer catalog pages 120 may comprise a webpage, document, or any other file or media file that is configured to include one or more images illustrating and/or visually-representing one or more of items 114. For instance, one of catalog pages 120 may include an image that one of customers 102 uploaded onto web servers 110(1)-(N). This image may be a digital photograph taken by the customer, an image taken off of the Web, an animation, or any other type of file capable of being rendered on one or more of catalog pages 120. This image may thus comprise any suitable file format, such as JPEG, PDF, HTML, or the like. Conversely, an operator of Website 106, a distributor or manufacturer of an item, or some other entity may instead provide this image.

Whatever its source, this image may include annotations about the image or the item(s) illustrated in the image. For instance, one of customers 102 may employ catalog page annotator 122 to describe an image included as a part of a catalog page. If, for instance, the image comprises a digital photograph of one of customers 102 in her running gear, this customer may describe the image as "My Favorite Running Outfit". This customer may also describe benefits of the outfit or may express any other personal message. In addition, this customer may associate an item illustrated in the image (e.g., her running shoes) with a hyperlink to a page associated with the running shoes within item catalog 112. This hyperlink may also correspond to a page hosted by a website other than website 106. This customer may similarly associate other items illustrated in the image with hyperlinks to the respective items within item catalog 112 or with hyperlinks to pages associated with the items and hosted by other websites.

Additionally, other customers, the website operator, or some other entity may annotate this image. For instance, one of customers 102 may associate an illustrated workout shirt with a hyperlink to a page associated with the shirt within item catalog 112, such as an item detail page or item review page. This customer could also comment on her experience with the workout shirt and/or the running shoes, or could provide a link to an address containing comments she has previously made about the items. This customer, the author of the page, the website operator, or some other entity may also suggest items to serve as alternatives to the illustrated items. In some instances, a hyperlink to the alternative items may be provided as a part of the catalog page. FIGS. 2-12 and an accompanying discussion describe the creation of and characteristics of catalog pages 120 in more detail.

Once a catalog page has been created, customers 102 may utilize user computing devices 104(1)-(M) (also referred to as "client computers" or simply "clients") to view the created page. User computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 124 and memory 126 to store applications and data. According to some embodiments, a browser application 128 is shown stored in memory 126 and executes on processor(s) 124 to provide access to website 106. Browser 128 renders web pages served by website 106 on an associated display. Although embodiments are described in the context of a web based system, other types of client/server based communications and associated application logic could be used. In addition, note that software applications other than a browser may similarly be employed.

When one of customers 102 accesses website 106, user computing device 104(1) submits a request to servers 110(1)-(N). Upon receiving the request, servers 110(1)-(N) return a web page 130 back to the requesting client computer. Here, web page 130 represents an example one of customer catalog pages 120. The customer operating computing device 104(1) may receive web page 130 in a number of ways. First, this customer may merely enter a uniform resource locator (URL) address into a browser toolbar or the like. Conversely, website 106 may include a catalog search page, from which the customer may search for a particular topic (e.g., "running"). If included in the search results, the customer may then select a link or an icon representing web page 130.

Figure 5:
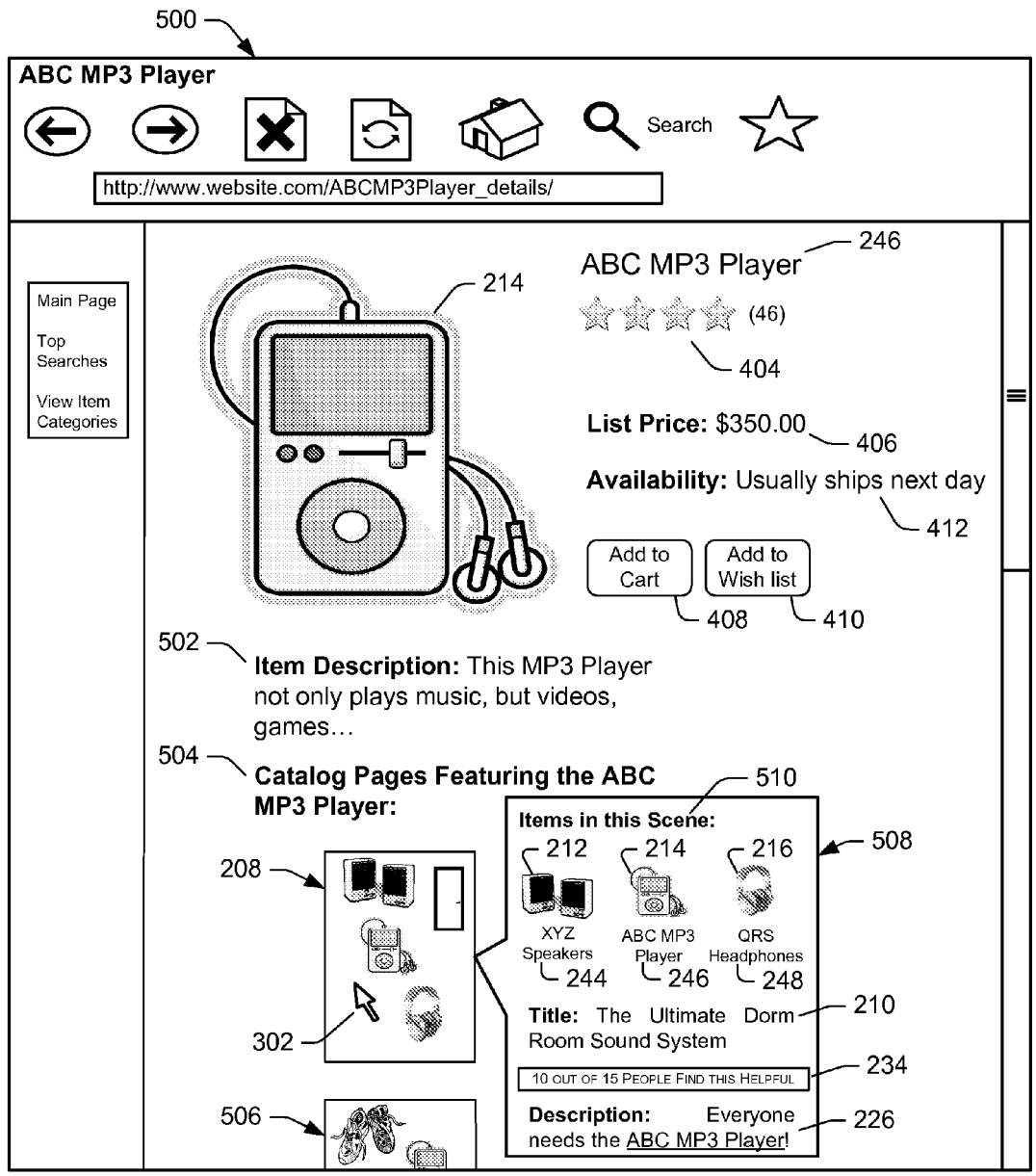
FIG. 5 illustrates a screen rendering of an illustrative item detail page, found within the electronic catalog, corresponding to the particular item highlighted in FIG. 4. As illustrated, the item detail page identifies multiple customer-annotated catalog pages, each of which illustrates the particular item.
Figure 6:
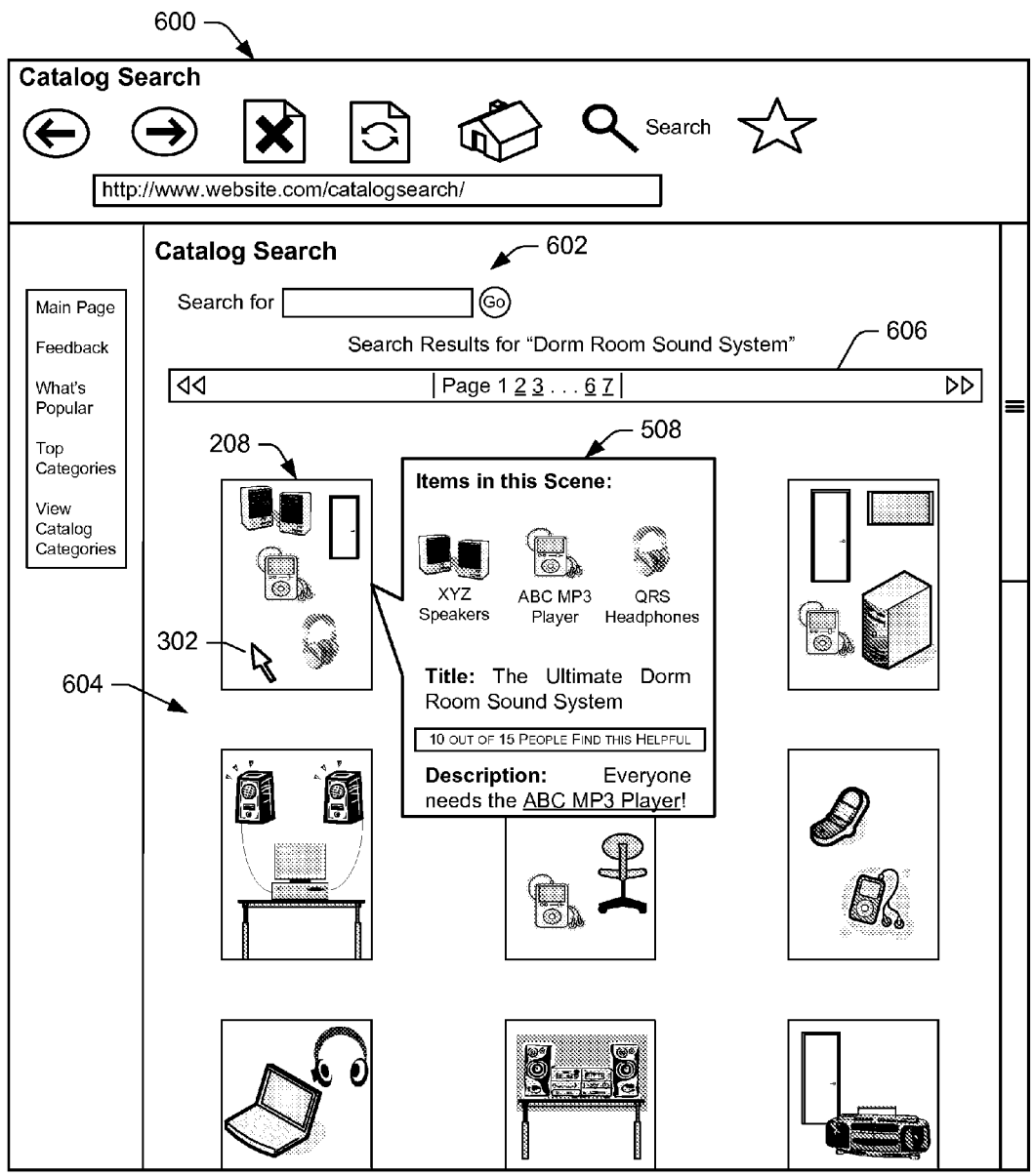

Additionally, a link to web page 130 may appear in an item detail page corresponding to an item illustrated in the image of web page 130. If, for instance, the customer navigates to an item detail page for a pair of running shoes, then a link to a catalog page that contains an image that illustrates the shoes may appear on the item detail page. From that page, the customer may select the link to the particular customer catalog page. The customer may also sort customer catalog 118 by categories and/or sub-categories. To retrieve a catalog page with the running shoes, for instance, the customer may search for a category entitled "Fitness" or the like. Finally, the customer could receive links to customer catalog pages via email, possibly sent by website 106. FIGS. 5-6 and an accompanying discussion describe, in greater detail, illustrative techniques for navigating to catalog pages 120.

Customer Catalog Pages

Figure 2:
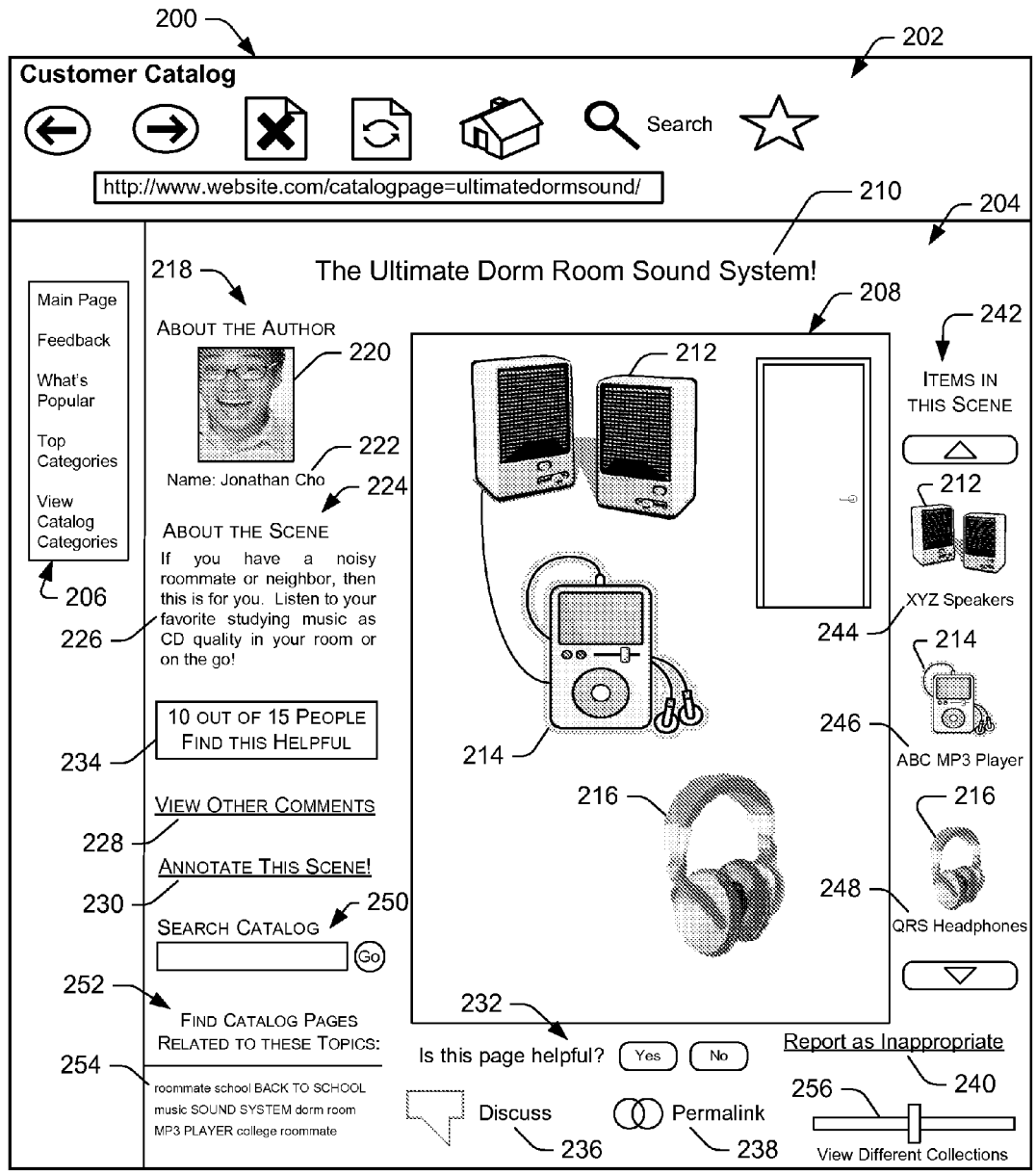
FIG. 2 illustrates a screen rendering of an illustrative customer-annotated catalog page. This catalog page includes an image that illustrates multiple items found within an electronic catalog.

FIG. 2 represents an illustrative customer catalog page 200. Customer catalog page 200 includes a browser toolbar 202 and a content area 204. Browser toolbar 202 enables a user of the merchant web site to navigate to a customer catalog page such as page 200. Content area 204, meanwhile, includes a menu 206, an image 208, and a title 210. Menu 206 includes multiple links to web pages hosted and served by the merchant website. This menu includes, for instance, a link to different catalog categories from which a user may peruse or search. Image 208, meanwhile, may comprise many of the characteristics described above in regards to catalog pages 120. Image 208, for instance, here comprises a digital photograph that has been uploaded by a user (e.g., one of customers 102) of the merchant website. Note that in some instances, image 208 is a single image. That is, image 208 is a standalone file which may illustrate multiple items within item catalog 112. Likely inspired by image 208, the user (i.e., the "author" of the page) has entitled customer catalog page 200 "The Ultimate Dorm Room Sound System!"

Here, image 208 includes three items included within an electronic catalog such as item catalog 112. As illustrated, this image includes speakers 212, an MP3 player 214, and a set of headphones 216. Because this image comprises a digital photograph, the image also illustrates a door to the user's dorm room and may also illustrate other articles or scenery that a typical photograph would illustrate. In addition to illustrating the three items 212-216, customers 102 of the merchant website, an operator of the merchant website, and/or some other entity may associate one or more of these items to their respective item detail pages within item catalog 112. For instance, speakers 212 may be associated with a page that is associated with speakers 212. This associated page may include, for instance, an item detail page for speakers 212, an item review page for speakers 212, a page hosted by another website that includes speakers 212, or any other page that pertains to these speakers.

Figure 3:
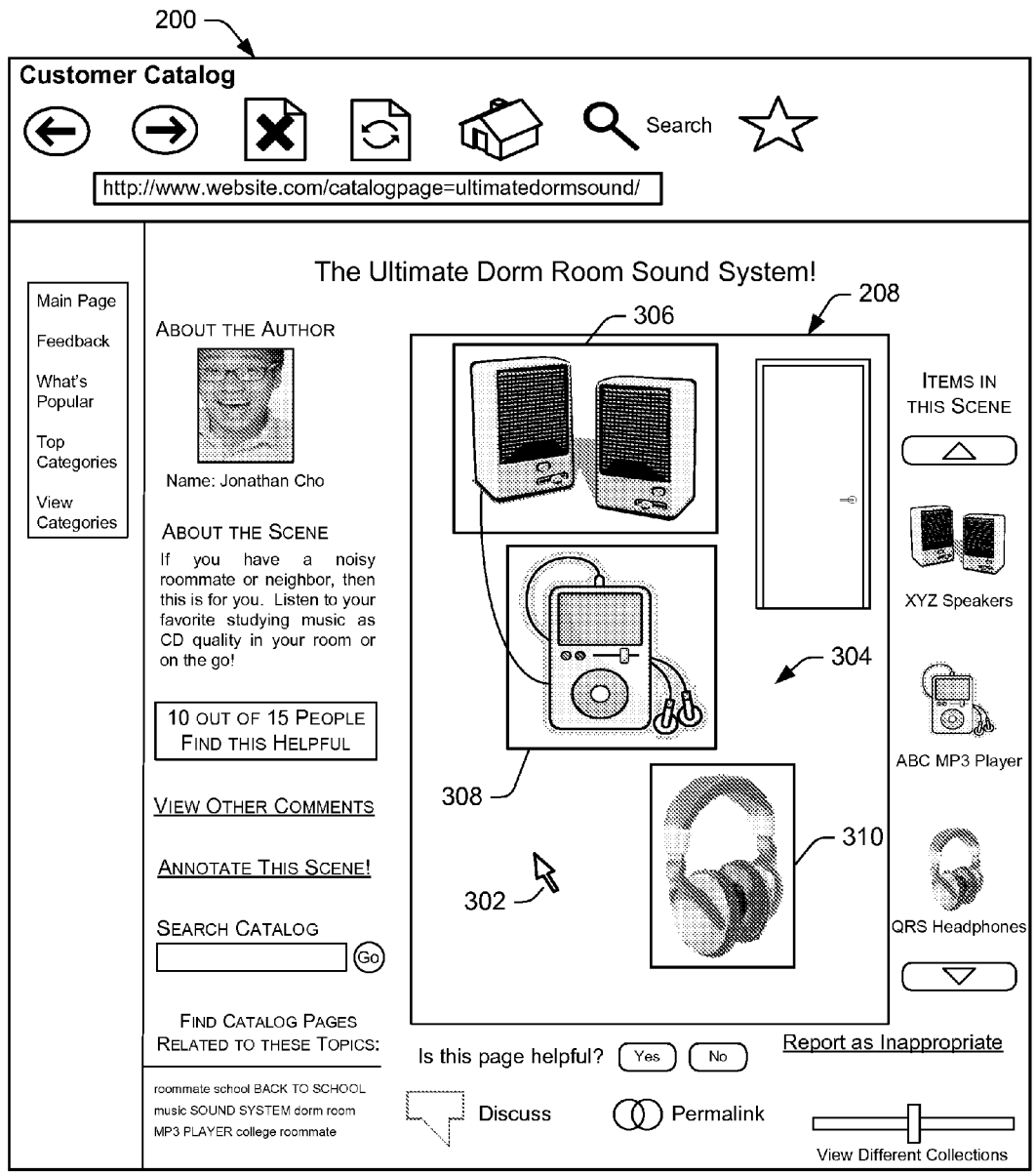
FIG. 3 illustrates a screen rendering of the illustrative customer-annotated catalog page of FIG. 2 at a time when a cursor is hovering over the image. As illustrated, the catalog page identifies illustrated items responsive to the hovering cursor.
Figure 4:
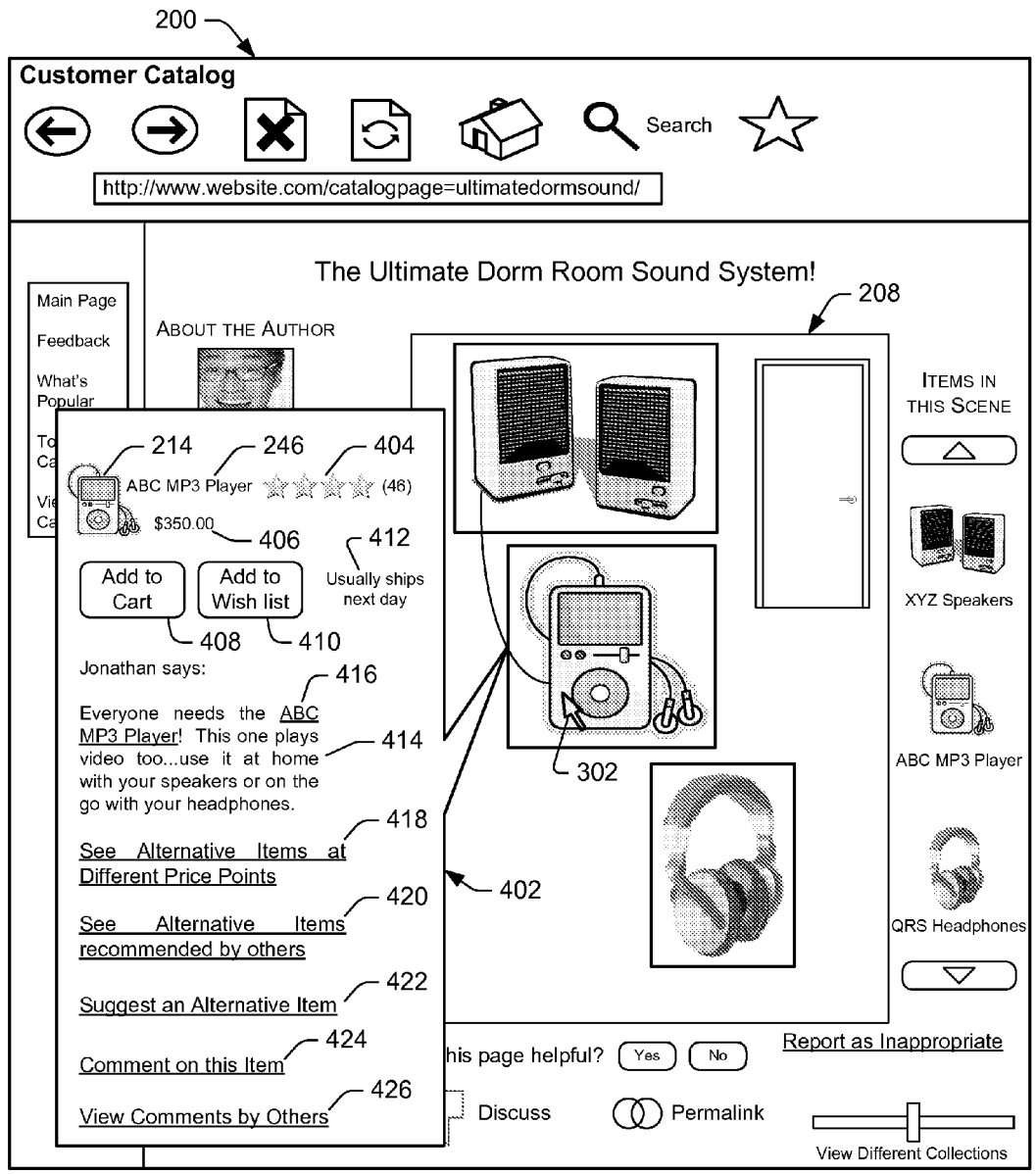
FIG. 4 illustrates a screen rendering of the illustrative customer-annotated catalog page of FIG. 2 at a time when a cursor is hovering over a particular item illustrated in the image. Here, the catalog page illustrates metadata about the particular item responsive to the hovering cursor.

In the illustrated implementations, the associated page is an item detail page for speakers 212. Therefore, when a user rolls a cursor over the speakers, a link (e.g., a hyperlink) to the corresponding item detail page may appear. Alternatively or additionally, if a user selects (e.g., clicks on) speakers 212 within image 208, the item detail page may be served to the user's computing device. FIGS. 3-4 describe this association in greater detail.

Content area 204 also includes information 218 "About the Author" of catalog page 200. This author may comprise the user who uploaded image 208, the user who first annotated image 208, the user who last annotated image 208, or some other individual or entity. In instances where multiple users annotate the image, catalog page 200 may include multiple authors, some or all of which may be recognized by information 218. In the illustrate embodiment, the user who uploaded image 208 is the author. Here, the author consists of the user who initially uploaded and annotated image 208 (i.e., the user that "created" customer catalog page 200).

As illustrated, information 218 includes a picture 220 representing the author. Picture 220 may alternatively or additionally comprise an icon or other symbol representing or chosen by the author. Information 218 also includes an author's name 222, which may comprise a legal name, screen name, and/or some other identifier. Here, the author's name is shown to be "Jonathan Cho".

Image 208 also includes information 224 "About the Scene". Information 224 may include a description 226 of image 208, or may include any other personal message chosen by the author, one or more other users, the website operator, and/or some other entity. Here, the author entered description 226, which states the following: "If you have a noisy roommate or neighbor, then this is for you. Listen to your favorite studying music as CD quality in your room or on the go!" In addition, the author may associate the catalog page 200 with a set of tags (e.g., "sound system", "dorm room", etc.).

Catalog page 200 thus enables a user of a merchant website to upload and annotate an image or annotate an existing image. This user entitles and describes the scene, and may also associate links (e.g., hyperlinks) to pages associated with the illustrated items. Additionally, other users or the website operator may also annotate image 208, as discussed immediately below.

In addition to providing description 226 entered in by the author of page 200, content area 204 includes an area 228 that enables users such as customers 102 to "View Other Comments" about image 208 and/or illustrated items 212-216. Here, area 228 comprises a link that, when selected, shows one or more comments about the image and/or items, possibly made by one or more of customers 102. In other instances, however, area 228 may list the comments themselves within content area 204 (e.g., in an order determined by the date that each comment was posted).

Additionally, content area 204 includes an area 230 that enables users such as customers 102 to "Annotate this Scene!" That is, selection of area 230 allows a user of the merchant website to annotate image 208. This user may choose to describe her previous experience with one of the items (e.g., MP3 player 214), or may choose to associate one of the items (e.g., MP3 player 214) with a link to a page such as an item detail page for that particular item. While FIG. 2 illustrates area 230 as a link, in other instances this area may comprise a text box in which a user may enter and post comments.

In some embodiments, the merchant website may employ certain barriers to entry before allowing users or other entities to annotate images such as image 208. For instance, the merchant website may require that a user has not previously been cited for inappropriately annotating images (e.g., once or a threshold number of times). The merchant web site may alternatively or additionally require that a user have purchased an item generally from the merchant website or may require that the user have purchased the item for which the user wishes to annotate.

As illustrated, content area 204 further includes an area 232 to allow a user to voice her opinion on the helpfulness of catalog page 200. Here, area 232 comprises the question of: "Is this Page Helpful?", and includes a "Yes" and "No" icon that the user may select in response to the question. Content area 204 also includes a results section 234 indicating the number of users that have found catalog page 200 helpful. Here, ten of fifteen users have found this page helpful. In some instances, the merchant website may take down catalog page 200 or may take other action responsive to receiving a certain percentage or threshold of "No" votes.

Additionally, content area 204 or another web page may track and display a number of times that users have visited catalog page 200 and/or selected or purchased items illustrated in image 208. In some instances, this tracking enables generated revenue to be shared amongst the merchant website and another individual or entity. For instance, if a user purchases an item after selecting the item from image 208, the merchant website may share a portion of the generated revenue with the author of the page. If a third party (e.g., one of customers 102) annotated image 208 to include a link to the item detail page, meanwhile, then that third party may additionally or alternatively share in this portion of the revenue. Finally, imagine that the link leads to a webpage that is not controlled by the merchant website but rather by a third party seller. Here, if a purchase is made, then the third party seller may agree to share generated revenue with the merchant website in exchange for the merchant website enabling the annotated link on image 208.

Catalog page 200 also includes a discussion link 236 that, when selected, allows the viewing user to navigate to a chat room or the like to discuss catalog page 200 as well as potentially other features of the merchant website. Catalog page 200 also includes a permalink 238 that enables the viewing user to bookmark catalog page 200 in the page's current state.

A link 240 to report the catalog page as inappropriate resides near permalink 238 in the illustrated embodiment. A viewing user may decide to select this link for a variety of reasons, such as if image 208 contains disagreeable content (e.g., violent images) or if an incorrect link has been associated with an illustrated item. For instance, imagine that a particular company ("ABC") markets and sells MP3 player 214. Imagine also that a user associates, with MP3 player 214, a link that corresponds to an item marketed by a competitor of the ABC company. Here, a user that views catalog page 200 may select link 240 to report this inappropriate association. Responsive to receiving this selection (or a threshold number of selections), the merchant website may take down catalog page 200, may investigate annotations within the page, or may take other investigative or remedial action.

As illustrated, content area 204 also includes a list 242 of those items that image 208 illustrates and that have been associated with a link to a respective associated page, such as an item detail page. Here, each of items 212-216 has been associated with a link to a respective item detail pages within item catalog 112. List 242, therefore, depicts each of items 212-216, and also includes a name 244, 246, and 248 for each item. Here, each of names 244-248 specify the item as well as a brand name under which the item is sold. Although list 242 depicts illustrations and names of items 212-216, other embodiments of catalog page 200 may instead list one or the other, or may exclude list 242 altogether.

Content area 204 may also include an icon entitled "Buy it All!" or the like. When selected, this icon enables the user to purchase each item within list 242. Content area 204 may accordingly also illustrate a total price of the collection. That is, content area 204 may illustrate the total cost associated with purchasing the collection of items within list 242. In some instances, this total cost may include a discount when compared with purchasing each of the items individually. Content area 204 may also include an icon entitled "See Alternative Collections at Different Price Points". When this icon is selected, another list similar to list 242 may appear with items to serve as alternatives to items 212-216.

A price slider 256 for the collection may also be illustrated. When slid to the left, for instance, content area 204 may illustrate less expensive collections, while content area 204 may illustrate more expensive collections when a user slides the slider to the right. This price slider may also include multiple sub-sliders that relate to each item within list 242. For instance, a user may slide a sub-slider corresponding to speakers 212 to the right if the user wishes to view high-end speakers. Conversely, the user may not place as much value in headphones. The user may accordingly slide this sub-slider more to the left. As such, when the user slides the collection price slider left and/or right, content area 204 will illustrate different collections at different price points, while at the same time taking into account the user's preference for higher-end speakers and lower-end headphones. Users, the website operator, or another entity may choose alternative items to illustrated in response to a user altering price slider 256 and/or another sub-slider. These alternative items may be determined by looking to the specifications or other characteristics (e.g., brand, color, model, etc.) of the illustrated items and choosing items with similar or the same specifications and/or characteristics. Of course, items having differing specifications may also be included as alternatives. While price sliders have been discussed, other mechanisms may also be employed and are similarly envisioned to enable the user to view alternative but similar item collections at differing price points or the like. Finally, note that if the catalog page illustrates a total price for the collection of items, this price may change as the user modifies the slider and/or sub-sliders.

If a user wishes to search for catalog pages other than catalog page 200, meanwhile, content area 204 includes a search tool 250. Search tool 250 includes a text box that allows a user to enter a search term or phrase and search customer catalog 118. FIG. 6 illustrates example results of such a search, and is discussed in detail below. Content area 204 also includes an area 252 entitled "Find Catalog Pages Related to These Topics" to further simplify a user's navigation experience. Adjacent area 252 resides a list 254 of topics to which catalog page 200 relates. If, for instance, a user selects one of the topics from list 254 (e.g., "Sound System"), the merchant website will return a search results page listing catalog pages related to that topic.

FIG. 3 illustrates catalog page 200 at a time when a cursor 302 hovers over image 208. A user such as one of customers 102 operating computing device 104(1) may operate cursor 302 via a point-and-select device such as a mouse, keyboard, rollerball, or the like. As illustrated, when cursor 302 hovers over image 208 a plurality of highlights 304 identify items within image 208 that have been annotated. For instance, a highlight 306 approximately borders speakers 212, while a highlight 308 borders MP3 player 214 and a highlight 310 borders headphones 216. While illustrated highlights 306-310 approximately border a respective one of items 212-216, in other embodiments these highlights may identify these items in other ways responsive to hovering cursor 302. In addition, while FIG. 3 illustrates that highlights 306-310 appear responsive to cursor 302 hovering over image 208 (and more specifically, a portion of the image that does not correspond to an illustrated item), in other embodiments these highlights may appear at other times. For instance, these highlights may appear at all times or when the user actually selects (e.g., clicks on) image 208.

As stated above, a highlight may identify an item that a user, website operator or other entity has annotated. That is, a highlight may identify those items that some individual or entity has described, commented on, or linked to an associated page such as a respective item detail page within item catalog 112. In some embodiments, highlights serve to identify items that have been associated with a link to associated pages within the item catalog or otherwise, but do not identify items that have only been commented upon.

FIG. 4, meanwhile, illustrates catalog page 200 at a time when cursor 302 hovers over a portion of image 208 that corresponds to an annotated item (here, MP3 player 214). Responsive to this hovering, catalog page 200 may depict a pop-up box 402 that illustrates metadata about the item. Again, while FIG. 4 illustrates pop-up box 402 as appearing when cursor 302 hovers over the item, catalog page 200 may similarly depict pop-up box 402 at other times. For instance, catalog page 200 may depict pop-up box 402 when the user selects the item with cursor 302, at all times, or when cursor 302 hovers over any part of the image. In the latter embodiments, catalog page 200 may thus illustrate a pop-up box for each of items 212-216 when cursor 302 hovers over image 208.

In the illustrated embodiment, pop-up box 402 includes metadata about MP3 player 214. In instances when the item has been associated with a corresponding link to, for example, an item detail page, catalog page 200 may pull and display metadata from the item detail page. Here, pop-up box 402 includes an illustration of MP3 player 214, name 246 of the player, and a rating 404 of the MP3 player. Rating 404 may comprise a community-generated rating or the like and is pulled into pop-up box 402 from the MP3 player's item detail page. Here, rating 404 shows that MP3 player 214 has received four stars and has been voted on by 46 users. In addition, pop-up box 402 illustrates a price 406 of MP3 player 214 on the merchant website. Again, catalog page 200 (and, more specifically, pop-up box 402) likely pulls this data from the player's item detail page. That is, catalog page 200 likely pulls this data from the item catalog, similar to how the item detail page pulls this information in response to receiving a request for the item detail page.

As FIG. 4 illustrates, pop-up box 402 also includes an icon 408 entitled "Add to Cart" and an icon 410 entitled "Add to Wish List". When selected, icon 408 places MP3 player 214 in an electronic shopping cart of the user. The user may then check out and purchase this and possibly additional items. When the user selects icon 410, meanwhile, the merchant website places MP3 player 214 on a wish list that the website maintains for the user. Pop-up box 402 additionally illustrates an availability indicator 412 corresponding to MP3 player 214. Here, availability indicator 412 states that the player "usually ships [the] next day".

As discussed above in regards to FIG. 2, catalog page 200 allows an author or other user to include information 224 "About the Scene" portrayed by image 208. Catalog page 200 similarly allows the author, another user, the website operator, or some other entity the ability to comment on a particular item such as MP3 player 214. Here, pop-up box 402 illustrates a description 414 as entered by Jonathan, the author of catalog page 200.

Description 414 not only includes a message about the player as provided by Jonathan, but also includes a hyperlink 416 ("ABC MP3 Player") to the item detail page corresponding to the player. Hyperlink 416 has thus been associated with MP3 player 214, possibly in a manner as discussed below with reference to FIGS. 7-12. As such, catalog page 200 allows a viewing user to navigate to the page, hover over MP3 player 214, view pop-up box 402, and select a hyperlink to the item detail page corresponding to the player. This user may also do the same for speakers 212 and headphones 216, which likely relate to the MP3 player as being components to the author's "Ultimate Dorm Room Sound System." Catalog page 200 thus furthers a goal of the merchant website to display, to users of the website, related items offered for sale in item catalog 112. In addition, pop-up box 402 (as well as similar pop-up boxes for items 212 and 216) enables the users to easily navigate to item detail pages for the related illustrated items.

In addition to illustrating potentially-related products within image 208, catalog page 200 also enables a user to view alternative items. Links 418 and 420, for instance, enable a user to view items to serve as an alternative to MP3 player 214. Link 418, here entitled "See Alternative Items at Different Price Points", comprises a hyperlink to alternative items generated by the merchant website. These alternative items may comprise items having similar characteristics of the illustrated items, but having different colors, brands, or the like. The merchant website may not only suggest similar items having varying or similar prices than that of the illustrated item, but may also suggest newer models or the like. The merchant website may particularly wish to make such suggestions for alternative items when the illustrated item is out of stock, no longer available, on backorder, or the like.

In addition to link 418, pop-up box 402 may include a price slider similar to price slider 256. This price slider allows a user to slide a dial to the right or the left, for example, to view more expensive alternative items and less expensive alternative items, respectively. In some embodiments, pop-up box 402 illustrates these alternative items as the user slides the dial of the price slider. Again, these items may be determined with reference to specifications and/or characteristics of the items. For instance, imagine that a brand carries a less-expensive MP3 player with specifications (e.g., memory, functions, etc.) that are similar to MP3 player 214. This less-expensive MP3 player may be illustrated in response to a user moving the price slider to the left. Again, users, the website operator or some other entity may suggest these differently-priced items.

Link 420, meanwhile, enables a viewing user to view alternative items suggested by other users such as customers 102 of the merchant website. Similarly, pop-up box 402 includes a link 422 entitled "Suggest an Alternative Item". When selected, link 422 allows the viewing user to navigate item catalog 112 to find an item to serve as an alternative to MP3 player 214. In some instances, catalog page 200 enables this action in a way similar to that described below with reference to FIGS. 7-12. In addition or in the alternative to navigating item catalog 112, the viewing user may describe an alternative item or upload an image of an alternative item similar to image 208.

Finally, pop-up box 402 includes a link 424 that, when selected, allows a viewing user to annotate MP3 player 214 by "Comment[ing] on This Item". If, for instance, the viewing user owns MP3 player 214, this user may wish to share her experience with the player. Pop-up box 402 thus includes a link 426, entitled "View Comments by Others", to allow this user to view other user's comments. In other embodiments, meanwhile, pop-up box 402 illustrates some or all of these comments without requiring a viewing user to select link 426.

A user of the merchant website may navigate to catalog pages such as page 200 in multiple ways. First, customer catalog 118 may organize catalog pages 120 according to categories. The user then either peruses through a category (e.g., "Home and Garden") or searches within the category. In some instances, the user may view catalog pages within a category according to the "helpfulness" of each page as voted on by other users. Again, users of the website may create categories and/or may upload catalog pages into one or more categories to which the users believe the pages belong. Second, the user may search for catalog pages via search tool 250. Again, FIG. 6 illustrates illustrative results of such a search and is described below. Third, catalog pages containing a certain item may be identified within pages associated with that certain item, such as the item's item detail page or item review page. Catalog pages containing a related item may also be identified, in some instances, within this associated page such as the item detail page.

FIG. 5 illustrates such an associated page (here, an item detail page 500) that identifies catalog pages. Item detail page 500 is likely served to a user's computing device in response to the user selecting the item, here MP3 player 214. For instance, the user may have searched for "MP3 Players" and selected a hyperlink associated with MP3 player 214 from a search results page. In addition to providing an image of the player, item detail page includes name 246 of the player, as well as rating 404, price 406, icons 408 and 410, and availability indicator 412. Item detail page 500 also includes an item description 502, which the website operator may provide. As illustrated, item detail page 500 includes a list 504 that identifies catalog pages "Featuring the ABC MP3 Player". This list illustrates the images from within the catalog pages that feature MP3 player 214. These images may be hyperlinked to corresponding catalog pages, such that selection of the image results in the corresponding catalog page being served to the user's computing device. As illustrated, list 504 at least includes images 208 (From FIGS. 2-4) and 506. Selection of the former image results in catalog page 200 being served to the user's computing device.

As illustrated, cursor 302 currently hovers over image 208 and, as such, the item detail page illustrates a pop-up box 508. Similar to pop-up box pop-up 402, pop-up box 508 includes metadata about catalog page 200. Pop-up box 508 may pull this metadata from catalog page 200. Also similar to pop-up box 402, other implementations of pop-up box 508 may include more or less information than the illustrated implementation.

Here, pop-up box 508 includes a list 510 of items that appear in the illustrated scene of catalog page 200. List 510 thus depicts speakers 212, MP3 player 214, and headphones 216. This list also identifies these items by names 244, 246, and 248, respectively. Pop-up box 508 also includes title 210, results section 234 (indicating the number of users that have found catalog page 200 helpful), and description 226.

FIG. 5 thus illustrates that catalog pages or identifications thereof may appear within corresponding item detail pages. These identifications enable a user to view information about corresponding catalog pages by, for instance, positioning a cursor over the identification such as the image. These identifications may also comprise a hyperlink to corresponding catalog pages. Users of the merchant website may thus navigate to customer catalog pages via related item detail pages.

FIG. 6 illustrates another way in which a user may navigate to customer catalog pages such as catalog page 200. FIG. 6 illustrates a catalog search results page 600, which includes a search tool 602 for searching customer catalog 118 as well as search results 604. Page 600 also includes a navigation tool 606 to enable a user to navigate amongst the returned catalog pages. Here, search results 604 include identifications of those catalog pages returned in response to a search for "Dorm Room Sound System". Similar to list 504 of FIG. 5, search results 604 identify catalog pages by corresponding images.

As illustrated, search results 604 include image 208 corresponding to catalog page 200. Again, image 208 may be hyperlinked to catalog page 200 such that selection of image 208 results in catalog page 200 being served to the user's computing device. Additionally, when cursor 302 hovers over image 208, pop-up box 508 appears. Again, pop-up box 508 illustrates metadata about catalog page 200. Pop-up boxes containing similar data may also appear over different illustrated images responsive to cursor 302 hovering over these images.

Creatine Customer Catalog Pages

While FIGS. 2-6 and the accompanying discussion describe characteristics of customer catalog pages, FIGS. 7-12 illustrate an illustrative manner of annotating images to begin creation of a customer catalog page.

Figure 7:
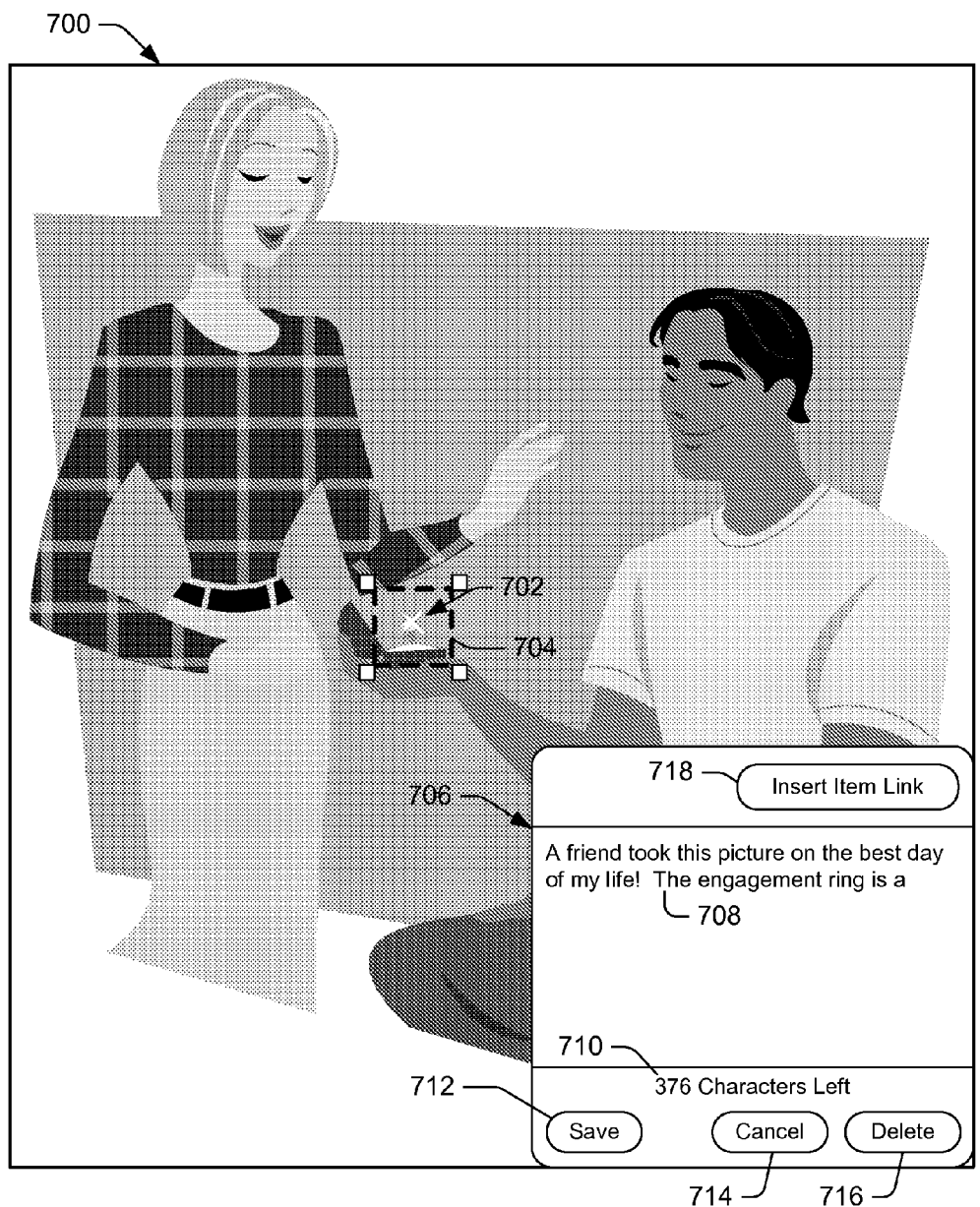
FIG. 7 illustrates a screen rendering of an illustrative image that a user may annotate while creating a customer catalog page. Here, a user highlights a particular item (a diamond ring) and provides commentary on the item in a text box.

FIG. 7 first illustrates a screen rendering of an example image 700 that a user of the merchant website may annotate.

As described above, this annotation may include describing the image and/or items therein or associating an illustrated item with a hyperlink to a page that is associated with the illustrated item, such as an item detail page. Also as described above, users may themselves upload images or the website operator may provide the images.

Image 700 includes an item (diamond 702) that is found within an electronic catalog such as item catalog 112. As illustrated, a user of the current example chooses to describe diamond 702. This user thus drags a box 704 around diamond 702, or around an area of image 700 that approximately frames diamond 702. When box 704 approximately frames an item, the item such as diamond 702 typically comprises at least 25% of the area framed by the box.

After dragging box 704 around diamond 702 to select the item, the user then selects an icon or otherwise chooses to comment on the diamond. In response to this choice, a text box 706 appears. Text box 706 allows the user to provide a description 708 of diamond 702. In some instances, text box 706 may limit the size of the comment and, hence, may include an indicator 710 that indicates to the user a remaining allowable size of description 708. Text box 706 also includes an icon 712 that allows a user to save description 708, an icon 714 that enables the user to cancel the description, and an icon 716 that enables the user to delete the description.

Finally, text box 706 includes an icon 718 that enables the user to "Insert [an] Item Link". When selected, icon 718 enables the user to associate selected item (here, diamond 702) a hyperlink. This associated hyperlink may, for instance, point to a webpage, either within the electronic catalog or otherwise, that is associated with the diamond. In instances where item catalog 112 includes diamond 702, the user may select icon 718 to associate a hyperlink to, for instance, an item detail page for diamond 702 with illustrated diamond. In other implementations, the user may instead associate a hyperlink to item review pages, discussion forum pages, pages hosted by a third party website, or any other page somehow associated with diamond 702.

Figure 8:
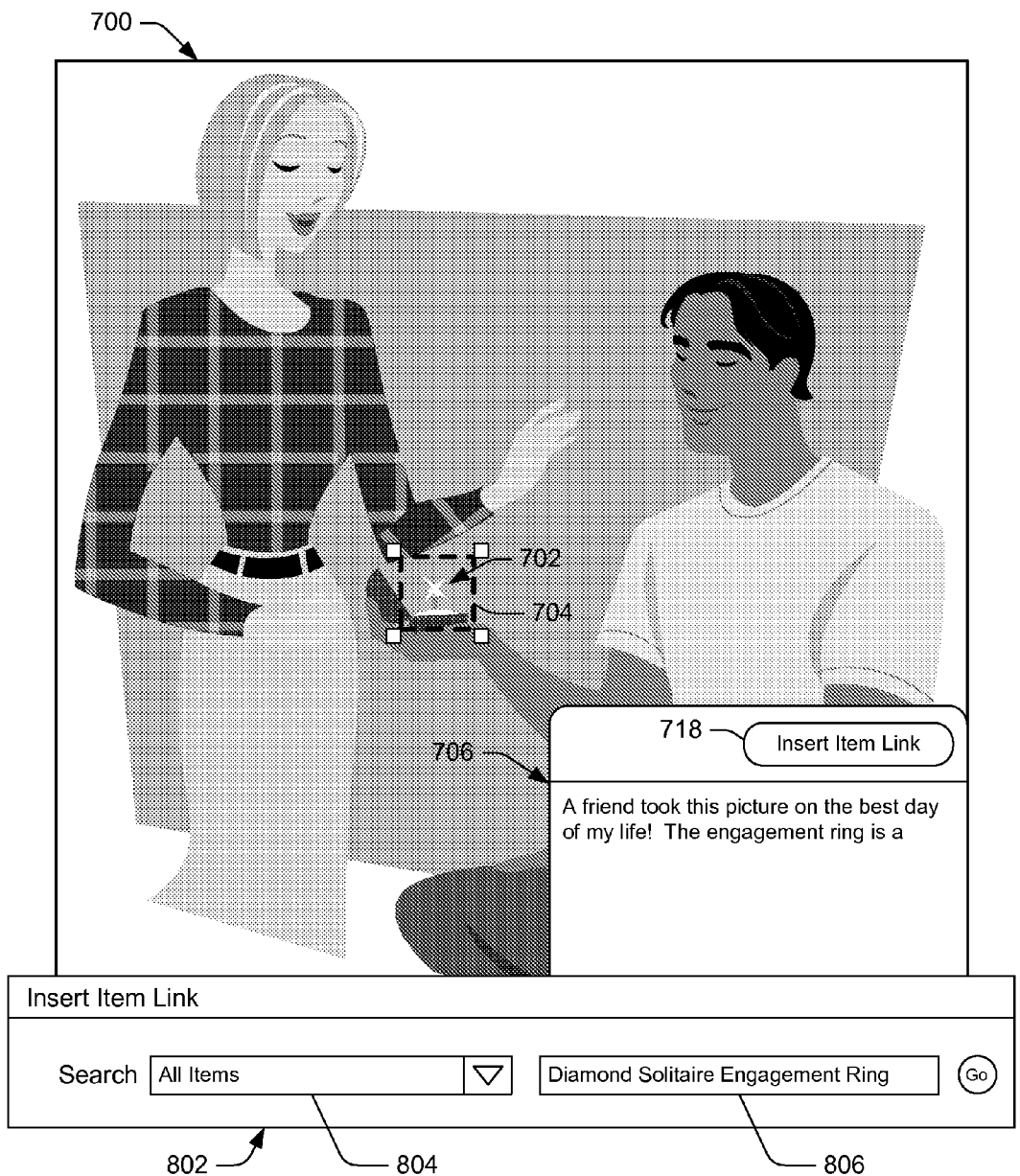
FIG. 8 illustrates another screen rendering of the illustrative image of FIG. 7. Here, the user selects an icon entitled "insert item link" to begin a process to associate the illustrated diamond ring with a hyperlink to a page that is associated with the diamond ring, such as an item detail for the ring.

FIG. 8 illustrates image 700 after the user selects icon 718. After selection of this icon, a user interface 802 appears. User interface 802 allows the user to search item catalog 112 for the illustrated diamond. User interface 802 thus includes a drop-down box 804 as well as a text box 806 in the illustrated implementation. Drop-down box 804 allows the user to choose categories from which to search for the illustrated item. Here, the user may choose to search a category entitled "Jewelry" in hopes of finding diamond 702. Text box 806, meanwhile, allows the user to enter in a search term. Here, the user has chosen to search "All Items" for a "Diamond Solitaire Engagement Ring".

Figure 9:
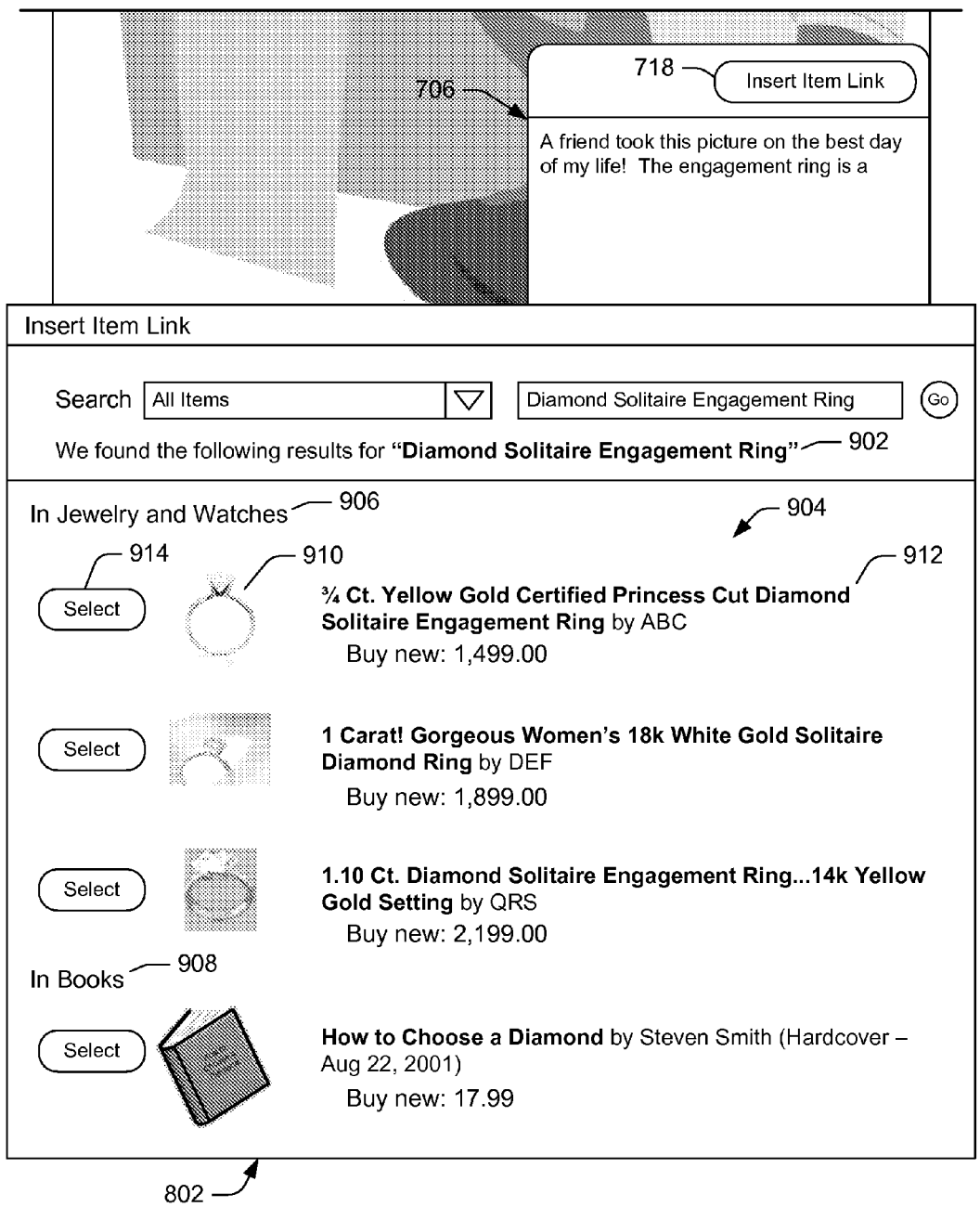
FIG. 9 illustrates another screen rendering of the illustrative image of FIG. 7. Here, the user searches the electronic catalog for the illustrated diamond ring in order to associate the illustrated ring with the proper hyperlink.

FIG. 9 illustrates image 700 after selection by the user of the "Go" button of user interface 802. User interface 802 now illustrates a heading 902 that states "We found the following results for 'Diamond Solitaire Engagement Ring'", as well as search results 904. Search results 904 indicate that two categories 906 and 908 return items within item catalog 112 responsive to the user's search. As illustrated, category 906, entitled "In Jewelry and Watches", returns three diamond rings in response to the search. In some instances, text associated with category 906 comprises a hyperlink that, when selected, shows other items within the category matching the search terms provided by the user. Category 908, meanwhile, is entitled "In Books" and shows a single book that is returned in response to the user's search.

With reference to the first diamond ring illustrated by category 906, user interface 802 includes an illustration 910 of the item, a description 912 of the item, and an icon 914 to enable the user to select the corresponding item. Here, if the user believes that this first diamond ring illustrated and described by illustration 910 and description 912, respectively, represents the illustrated diamond, then the user selects icon 914. By selecting this icon, the user associates diamond 702 (illustrated within image 700) with a link to an item detail page for the diamond represented by illustration 910.

Figure 10:
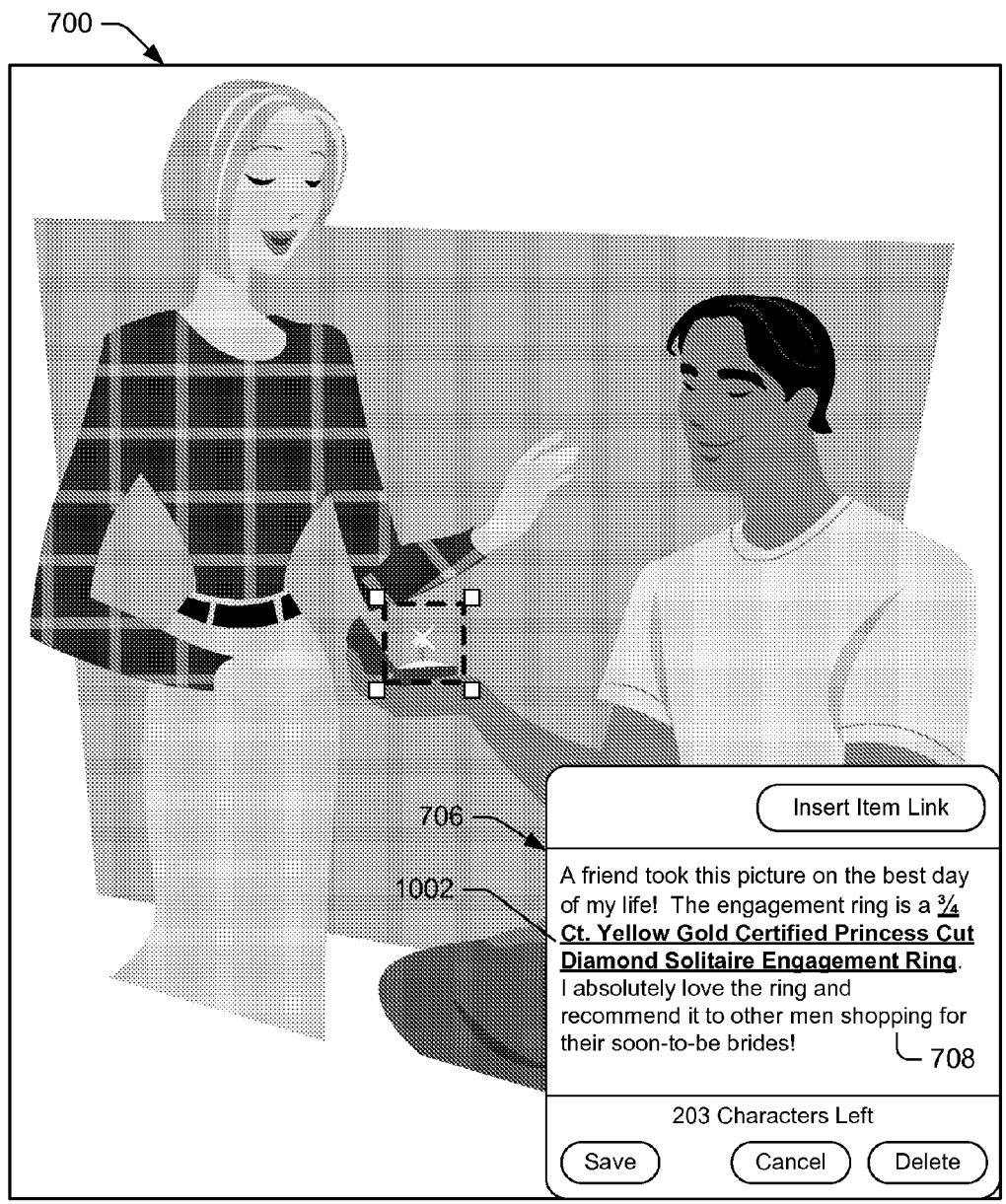
FIG. 10 illustrates another screen rendering of the illustrative image of FIG. 7. Here, the user has inserted into the text box a hyperlink to the item detail page for the diamond ring.
Figure 11:
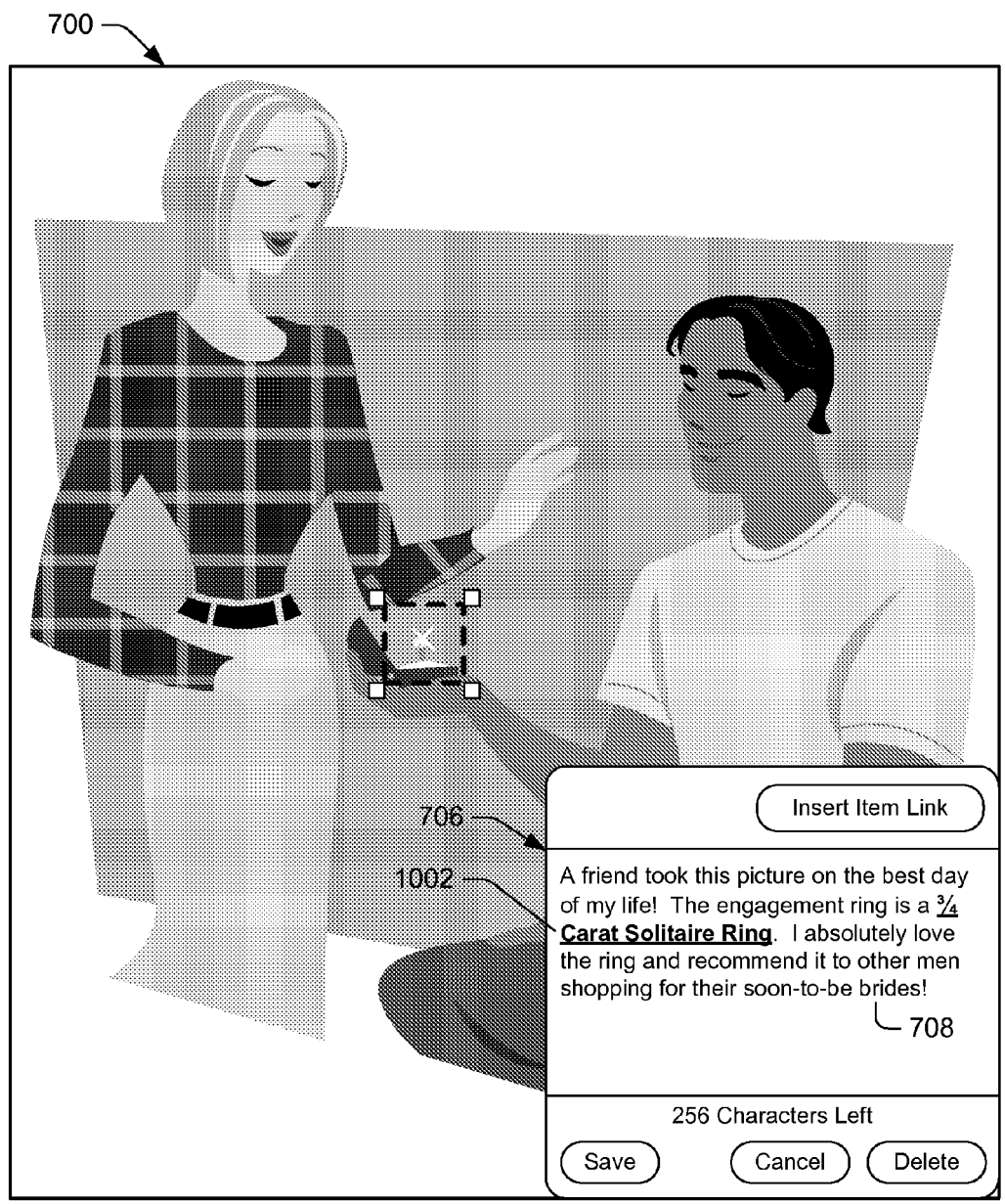
FIG. 11 illustrates another screen rendering of the illustrative image of FIG. 7. Here, the user has modified the text of the hyperlink.

FIG. 10 illustrates text box 706 after the user selects icon 914. As illustrated, description 708 now includes a hyperlink 1002, represented by bold and underline. Note that hyperlink 1002 is inserted within description 708 with a title that initially matches some or all of description 912 from FIG. 9. The user may, however, alter choose to alter this title. FIG. 11, for instance, illustrates that the user has altered the title of hyperlink 1002 to state "¾ Carat Solitaire Ring". By changing the title, hyperlink 1002 more precisely completes a user's sentence within description 708. Regardless of the title of hyperlink 1002, actuation of hyperlink 1002 results in the user's computing device being served with an item detail page for the diamond illustrated by illustration 910.

Figure 12:
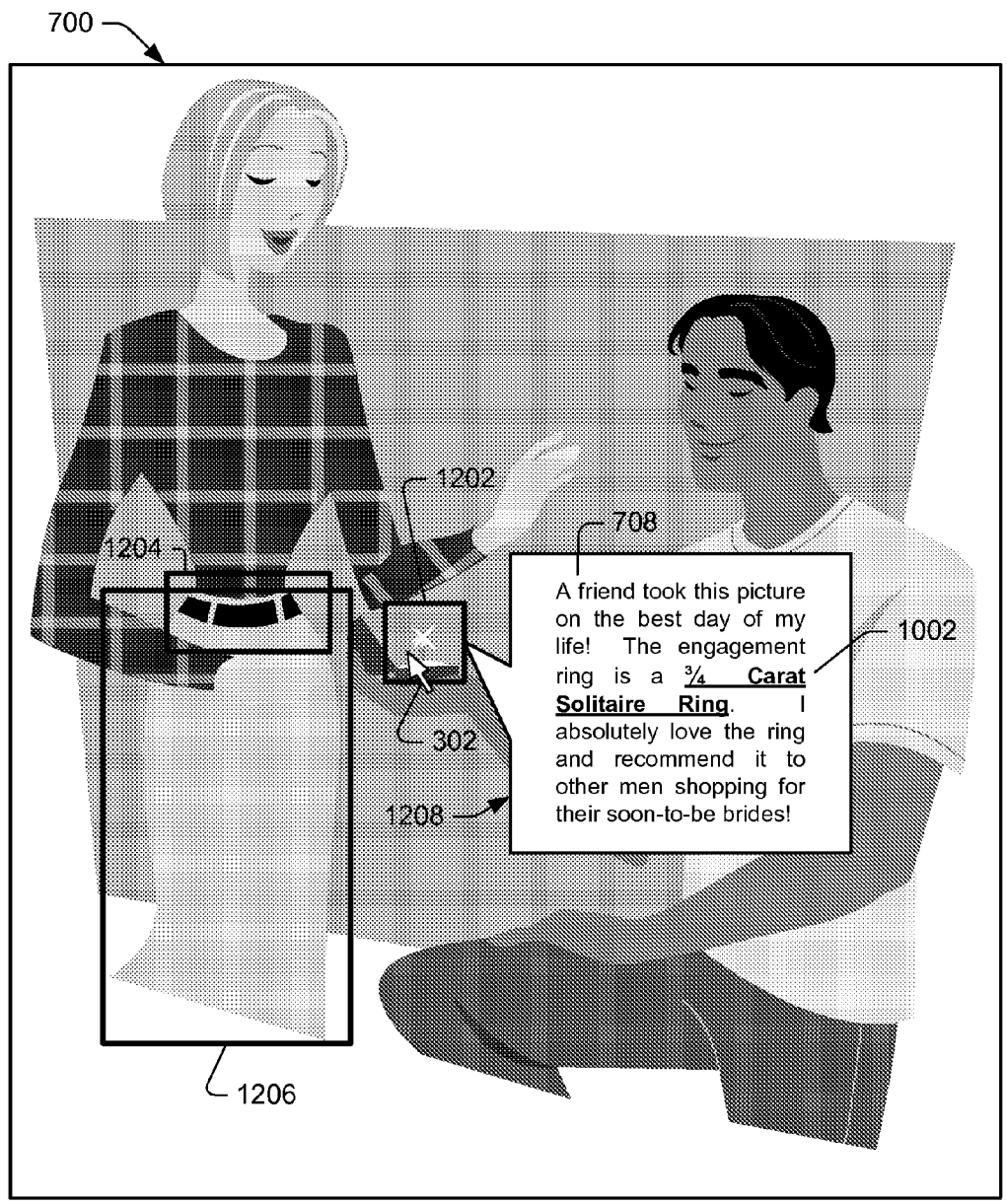
FIG. 12 illustrates another screen rendering of the illustrative image of FIG. 7. Here, a user's cursor hovers over the image and, more particularly, over an area that borders the diamond ring. In response to this hovering, the recently-created description and hyperlink are presented to the user.

FIG. 12 finally illustrates that the user has finished description 708 and has selected icon 712 to save the annotation of diamond 702. Therefore, when cursor 302 hovers over image 700, a highlight appears for each item that has been annotated. For instance, a highlight 1202 appears around diamond 702. Note that this highlight frames the diamond in the same manner as box 704 from FIGS. 7-8 and 10-11. Similarly, a highlight 1204 appears around a belt of the illustrated woman and a highlight 1206 appears around the woman's skirt. Users of the merchant website and/or the website operator have thus annotated the illustrated belt and skirt. In some instances, highlights 1204 and 1206 indicate that the belt and skirt, respectively, have been associated with a hyperlink to respective item detail pages within item catalog 112.

FIG. 12 also illustrates that cursor 302 currently hovers over diamond 702. That is, cursor 302 hovers within the box created by highlight 1202. Responsive to this hovering, a pop-up box 1208 appears, containing description 708, which itself includes hyperlink 1002 to the diamond's purported item detail page. While pop-up box 1208 only contains description 708 and hyperlink 1002, this box may also include some or all of the content described in regards to pop-up boxes 402 and 508. For instance, pop-up box 1208 may enable other users to comment on or otherwise annotate diamond 702.

Item Manager and Tag Score Calculator Implementation

Figure 13:
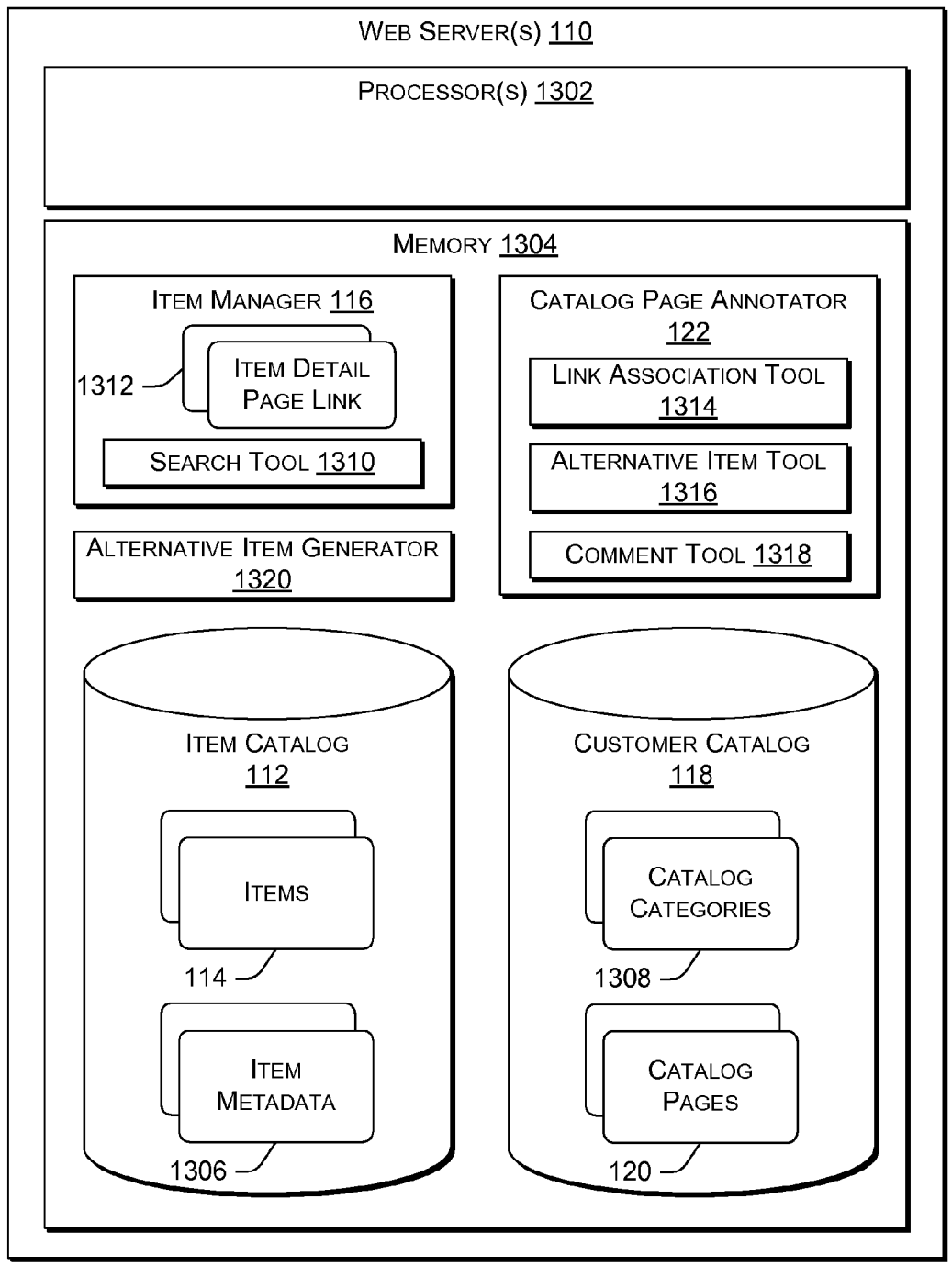
FIG. 13 is a block diagram illustrating embodiments of modules in an item manager and catalog page annotator from FIG. 1.

FIG. 13 illustrates example implementations of item manager 116, catalog page annotator 122, item catalog 112, and customer catalog 118 from FIG. 1. Illustrated web servers 110(1)-(N) have processing capabilities and memory suitable to store and execute computer-executable instructions. In this example, web server(s) 110 include one or more processors 1302 and memory 1304. Memory 1304 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As illustrated, item catalog 112 stores item records 114, as well as item metadata 1306. Item metadata 1306 comprises information about items represented by item records 114.

This information includes, for instance, price, color, availability, specifications, etc. Customer catalog 118, meanwhile, contains catalog pages 120 as well as catalog categories 1308. Catalog categories 1308 may include categories generated by the merchant website, as well as user-created categories. Each of catalog pages 120 resides or is otherwise associated with one or more of catalog categories 1308. Catalog page 200 discussed above, for example, may be associated both with a category entitled "Home Stereos" and a category entitled "Digital Audio Players".

Item manager 116 and catalog page annotator 122, meanwhile, are implemented as software or computer-executable instructions stored in memory 1304 and executed by one or more of processors 1302. Item manager 116 includes search tool 1310 to enable a user to search item records 114 within item catalog 112. Search tool 1310, or another similar search tool, also enables the user to search for catalog pages 120 within customer catalog 118. Item manager 116 also maintains links 1312 to item detail pages for item records 114.

Catalog page annotator 122 includes a link association tool 1314, an alternative item tool 1316, and a comment tool 1318. Link association tool 1314 allows a user to associate an item illustrated within one or more of catalog pages 120 with a link to a page that is associated with the item within item catalog 112. In some implementations, link association tool 1314 operates in a manner similar to that described with reference to FIGS. 7-12. Alternative item tool 1316, meanwhile, allows the user to suggest one or more of items 114 to serve as alternatives to an item that has been annotated within one of catalog pages 120. These alternative items may comprise similar items having different colors, brands, sizes, specifications, or the like. Comment tool 1318, meanwhile, enables the user to comment on an item illustrated within the catalog page.

Finally, FIG. 13 illustrates that memory 1304 includes an alternative item generator 1320. Alternative item generator 1320 serves to determine characteristics of an item illustrated within one of catalog pages 120. With these determined characteristics, alternative item generator 1320 automatically generates items to serve as alternatives to the illustrated item. With this tool, the merchant website automatically suggests alternative items, such as similar items having different colors, brand, specifications, or the like.

Operation

Figure 14:
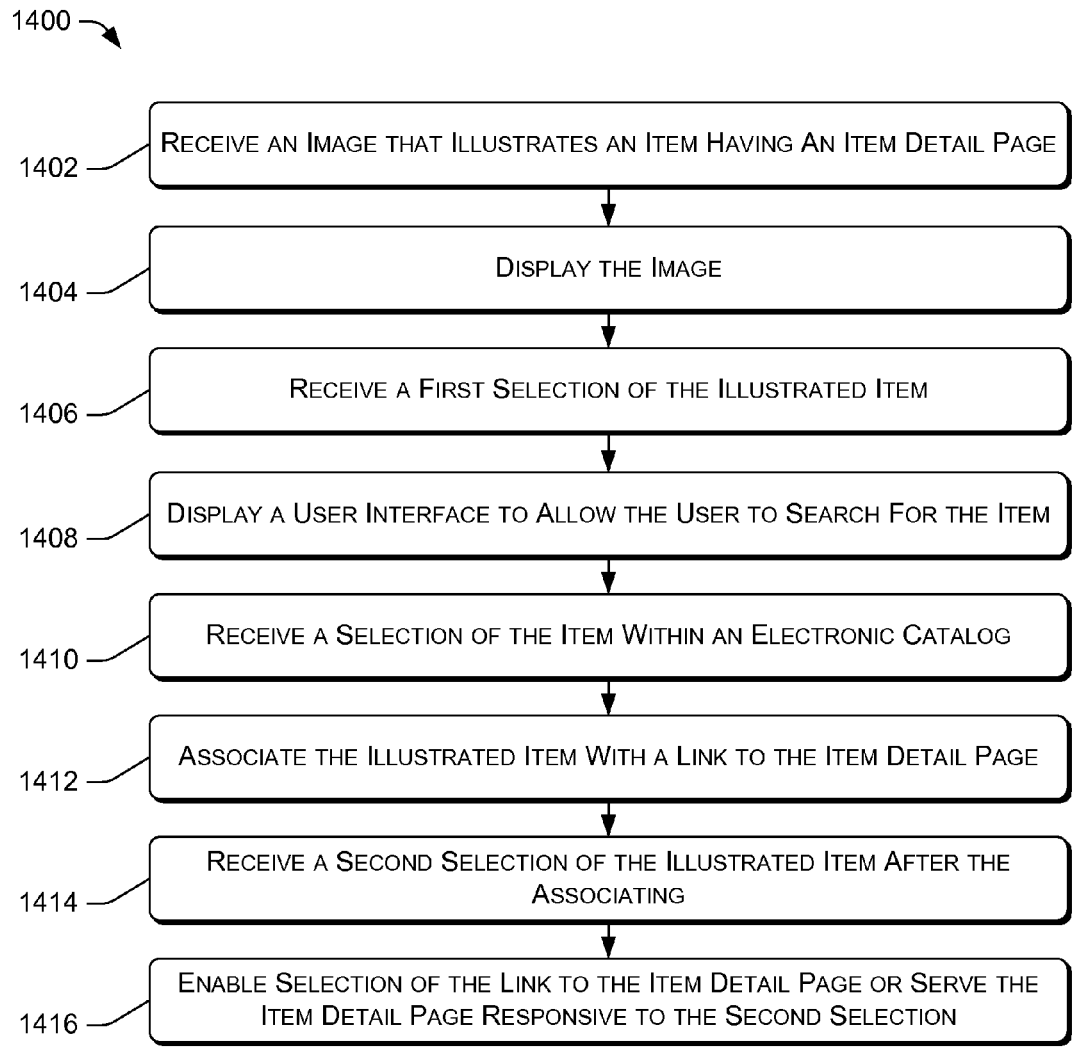
FIGS. 14-15 are flow diagrams of embodiments of processes for displaying an image that illustrates an item and associating the item with a hyperlink to a page that is associated with that item.

FIG. 14 illustrates an example process 1400 for displaying an image that illustrates an item and associating the item with a hyperlink to a page that is associated with the illustrated item, such as an item detail page. Process 1400, as well as subsequent processes described below, is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 1400 includes operation 1402, which represents receiving an image that illustrates an item having an item detail page within an electronic catalog. A user of a website, the website, or some other entity may provide the image. Operation 1404, meanwhile, represents displaying the image to the user. At operation 1406, a first selection of the illustrated item is received from the user. Operation 1408 then represents displaying a user interface to allow the user to search the electronic catalog for the illustrated item. At operation 1410, a selection of the item within the electronic catalog is received from the user and, at operation 1412, the illustrated item is associated with a link to the item detail page within the electronic catalog. Process 1400 also includes operation 1414, which represents receiving a second selection of the illustrated item after the associating. Responsive to this second selection, operation 1416 enables selection of the link to the item detail page or, in some instances, serves the item detail page.

Figure 15:
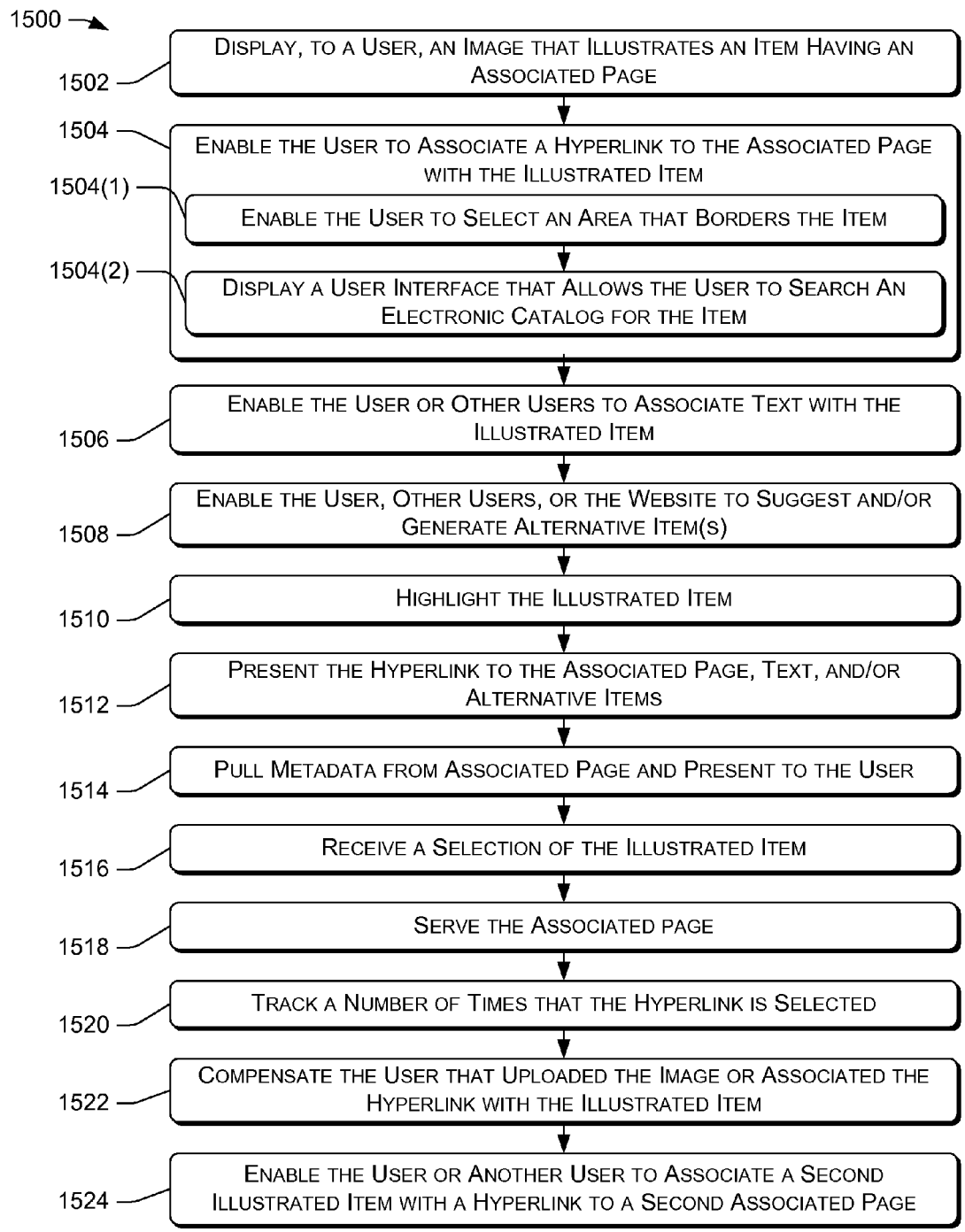

FIG. 15, meanwhile, illustrates another process 1500 for displaying an image that illustrates an item and associating the item with a hyperlink to a page that is associated with the illustrated item. Operation 1502 represents displaying, to a user of a merchant website, an image that illustrates an item within an electronic catalog and having an associated page. Operation 1504, which may comprise a series of sub-operations 1504(1)-(2), then enables the user to associate the illustrated item with a hyperlink to the associated page. Sub-operation 1504(1), meanwhile, enables the user to select an area that borders the item. This may be accomplished, for instance, by enabling the user to drag a box around the item. Sub-operation 1504(2) then displays a user interface that allows the user to search an electronic catalog for the item in instances when the associated page is found within the electronic catalog. When the item is found, the hyperlink to the associated page may be associated with the illustrated item.

Operation 1506 represents enabling the user or other users to comment on or associate text with the illustrated item. At operation 1508, the user, other users, or the website may suggest and/or generate items to serve as alternatives to the illustrated item. At operation 1510, the illustrated item is highlighted responsive to detection of a cursor hovering over the image. Similarly, operation 1512 presents the hyperlink to the associated page, presents text, and/or presents alternative items responsive to detecting the cursor hovering over the illustrated item. When presenting some of this data, operation 1514 pulls metadata from the associated page.

Operation 1516 then represents receiving a selection of the illustrated item, while operation 1518 represents serving the associated page responsive to the receiving of the selection. Operation 1520, meanwhile, tracks a number of times that the hyperlink is selected or the number of times that the hyperlink is selected and the illustrated item is purchased. At operation 1522, the user that uploaded the image and/or the user that associated the illustrated item with the hyperlink are compensated by, for example, sharing revenue of the sale. Finally, operation 1524 represents enabling the user or other users to associate a second illustrated item with a hyperlink to a page that is associated with the second item.

Figure 16:
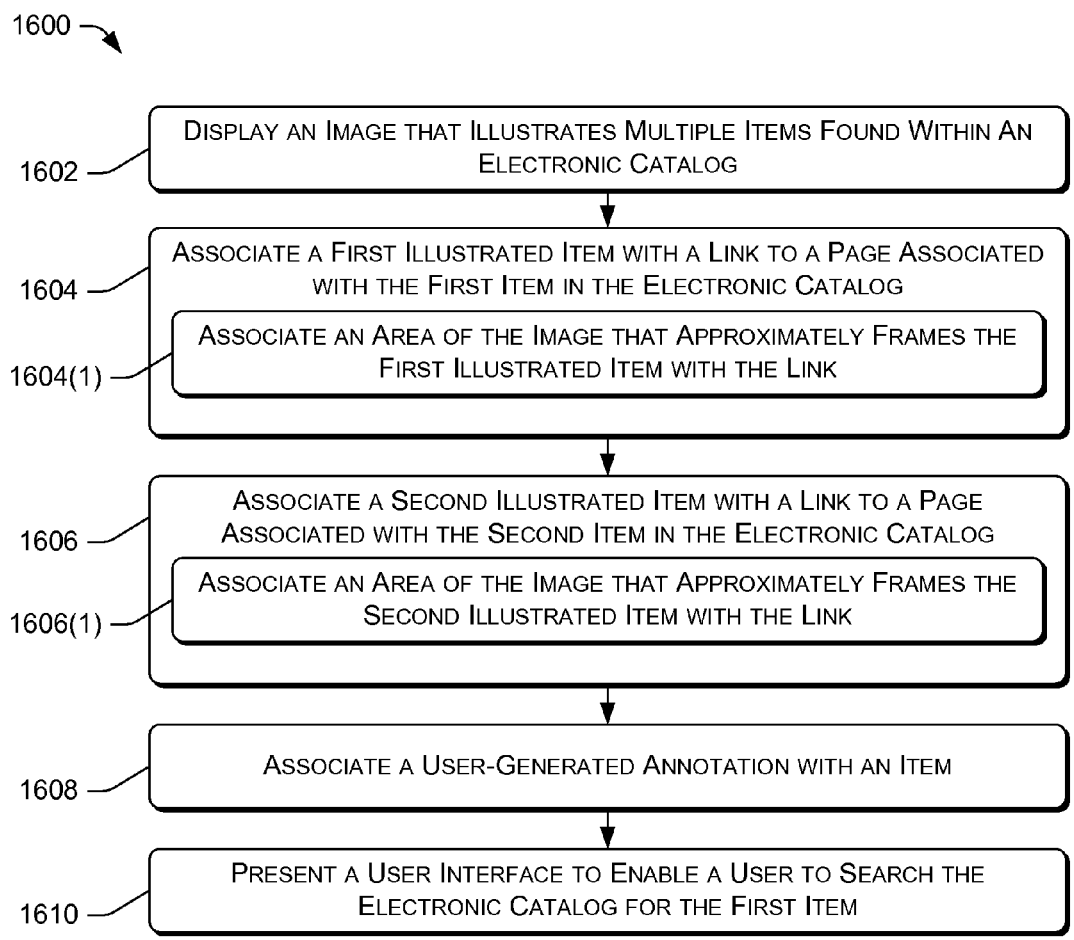
FIG. 16 is a flow diagram of an embodiment of a process for displaying an image and associating a first link to a page associated with a first item in the image and a second link to a page associated with a second item in the image.

FIG. 16 illustrates a process 1600 for associating multiple items illustrated within an image with corresponding associated pages, such as item review pages, item detail pages, or the like. This process includes operation 1602, which represents displaying an image that illustrates the multiple items found within an electronic catalog. Operation 1604 then associates a first item within a link to a page that is associated with the first item within an electronic catalog. This operation includes sub-operation 1604(1), which associates the link with an area of the image that approximately frames the first item.

Operation 1606 similarly represents associating a second item with a link to a page that is associated with the second item n the electronic catalog. Again, this operation includes sub-operation 1606(1), which associates the link with an area of the image that approximately frames the second item. Operation 1608 then represents associating a user-generated annotation with the first and/or the second item. Finally, operation 1610 presents a user interface to enable a user to search the electronic catalog for the first item in instances where the associated page is within the electronic catalog. Presentation of this user interface enables the association of the link with the illustrated first item.

Figure 17:
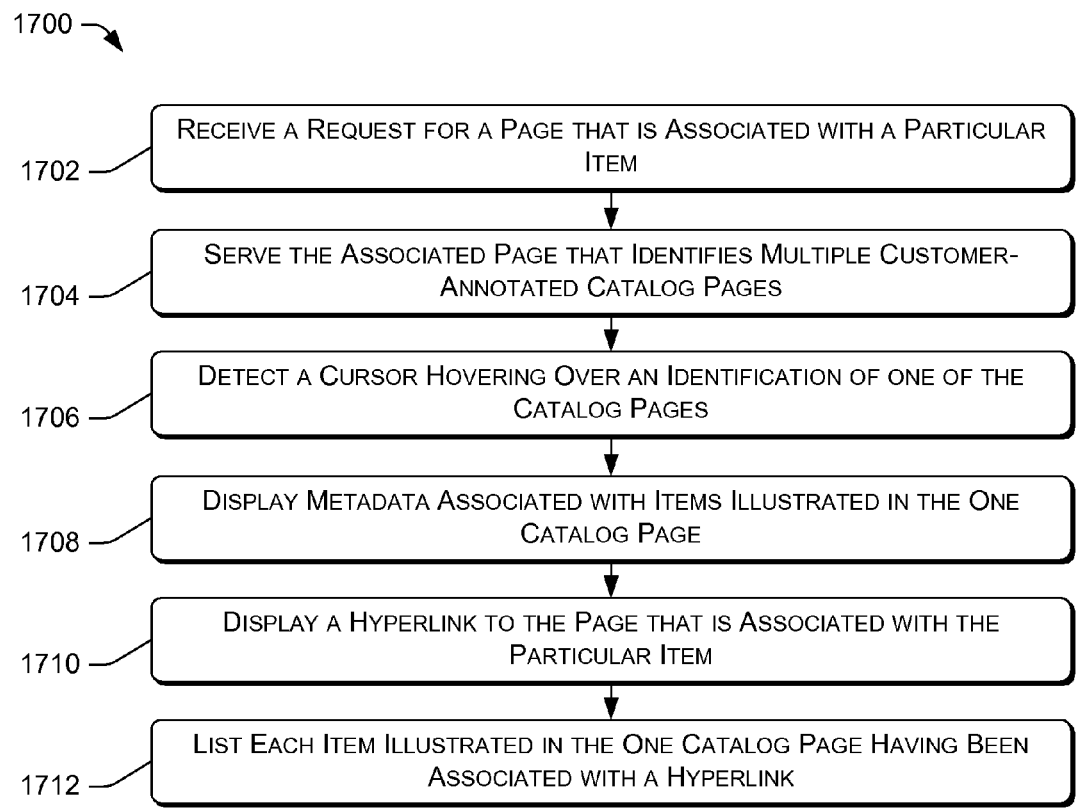
FIG. 17 is a flow diagram of an embodiment of a process for returning an identification of customer-annotated catalog pages within an item detail page corresponding to a particular item. Some or all of these identified catalog pages illustrate the particular item and include an association between the item and a link to a page that is associated with the item.

FIG. 17 finally illustrates a process 1700 for returning identifications of customer-annotated catalog pages within a page that is associated with a particular item. This process includes operation 1702, which represents receiving a request for a page that is associated with an item within an electronic catalog. The request may, for instance, stem from a user selecting a link associated with the item. Operation 1704, meanwhile, serves the associated page to the user's computing device, wherein the associated page identifies multiple customer-annotated catalog pages. Some or all of these identified pages illustrate the item underscored by the associated page.

At operation 1706, a cursor is detected as hovering over an identification of one of the returned customer-annotated catalog pages. Operation 1708 then represents displaying metadata associated with the items illustrated in the identified catalog page over which the cursor hovers. This metadata may include some or all of the metadata discussed above. For instance, operation 1710 represents displaying a hyperlink to the page that is associated with the currently-underscored item. Finally, operation 1712 represents listing each item illustrated in the currently-identified catalog page and having been associated with a hyperlink to a respective associated page within the electronic catalog or otherwise.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   under control of one or more computing systems of a merchant website, the one or more computing systems configured with executable instructions,
   receiving, from a user of the merchant website and at the one or more computing systems, an image that illustrates an item having a corresponding item detail page within an electronic catalog;
   causing display of the image to the user by the one or more computing systems;
   receiving, from the user and at the one or more computing systems, a selection of the illustrated item;
   responsive to receiving the selection, causing display of a user interface by the one or more computing systems to allow the user to search the electronic catalog for the item;
   receiving, from the user and at the one or more computing systems, a selection of the item within the electronic catalog; and
   associating, by the one or more computing systems, the illustrated item with a link to the item detail page within the electronic catalog.

2. A method as recited in claim 1, wherein the first selection comprises selecting an area within the image that borders the illustrated item.

3. A method as recited in claim 1, wherein:
   the first selection comprises selecting an area of the image that borders the illustrated item; and
   the second selection comprises selecting the area of the image that borders the illustrated item.

4. A method as recited in claim 1, where the selection of the illustrated item in the image is a first selection, and further comprising:
   receiving a second selection of the illustrated item after the associating; and
   enabling selection of the link to the item detail page or serving the item detail page responsive to the receiving of the second selection.

5. A method of implementing an electronic catalog of a merchant website, the method comprising:
   under control of one or more computing systems of the merchant website, the one or more computing systems configured with executable instructions,
   causing display of, to a user of the merchant website and by the one or more computing systems, an image that illustrates an item within the electronic catalog and having an associated page; and
   enabling, by the one or more computing systems, the user to associate a hyperlink to the associated page with the illustrated item.

6. A method as recited in claim 5, wherein the associated page is an item detail page for the illustrated item.

7. A method as recited in claim 5, wherein the associated page is a review page for the illustrated item.

8. A method as recited in claim 5, wherein the merchant website is a first website, and wherein a second website hosts the associated page.

9. A method as recited in claim 5, wherein the user or another user of the merchant website uploads the image to the merchant website.

10. A method as recited in claim 5, wherein the image comprises a digital photograph and wherein the user or another user of the merchant website uploads the digital photograph to the merchant website.

11. A method as recited in claim 5, wherein the merchant website provides the image to the user for associating the illustrated item with the associated page.

12. A method as recited in claim 5, wherein the enabling the user to associate the hyperlink to the associated page with the illustrated item comprises enabling the user to select an area that borders the illustrated item.

13. A method as recited in claim 5, wherein the enabling the user to associate the hyperlink to the associated page with the illustrated item comprises enabling the user to drag a box around the illustrated item.

14. A method as recited in claim 5, wherein the enabling the user to associate the hyperlink to the associated page with the illustrated item comprises displaying a user interface that allows the user to search the electronic catalog for the illustrated item.

15. A method as recited in claim 5, further comprising presenting the hyperlink to the associated page in response to a cursor hovering over the illustrated item in the image.

16. A method as recited in claim 5, further comprising pulling metadata from the associated page and presenting the metadata to the user in response to a cursor hovering over the illustrated item in the image.

17. A method as recited in claim 5, further comprising highlighting the illustrated item that is associated with the hyperlink in response to a cursor hovering over the image.

18. A method as recited in claim 5, wherein the image includes multiple items, each having an associated page, and each having been associated with a hyperlink to a respective associated page, and further comprising highlighting each of the multiple illustrated items in response to a cursor hovering over the image.

19. A method as recited in claim 5, further comprising:
receiving a selection of the illustrated item after the hyperlink to the associated page has been associated with the illustrated item; and
serving the associated page in response to receiving the selection of the illustrated item.

20. A method as recited in claim 5, further comprising enabling the user to associate text with the illustrated item.

21. A method as recited in claim 5, further comprising:
enabling the user to associate text with the illustrated item; and
presenting the associated text in response to a cursor hovering over the illustrated item in the image.

22. A method as recited in claim 5, wherein the item is a first item, the associated page is a first associated page, and the image also illustrates a second item having a corresponding associated page, and further comprising enabling the user or another user of the merchant website to associate a hyperlink to the second associated page with the illustrated second item.

23. A method as recited in claim 5, further comprising enabling the user to suggest one or more items to serve as alternatives to the illustrated item.

24. A method as recited in claim 5, further comprising displaying a user interface that allows the user to search the electronic catalog for one or more items to serve as alternatives to the illustrated item.

25. A method as recited in claim 5, further comprising:
displaying a user interface that allows the user or another user of the merchant website to search the electronic catalog for one or more items to serve as alternatives to the illustrated item;
receiving, from the user, a selection of an alternative item; and
presenting the alternative item or metadata associated with the alternative item in response to a cursor hovering over the illustrated item.

26. A method as recited in claim 5, further comprising enabling other users of the merchant website to comment on the illustrated item or the illustrated item's association with the hyperlink.

27. A method as recited in claim 5, further comprising:
generating one or more items to serve as alternatives to the illustrated item; and
presenting the one or more alternative items or a link to view the one or more alternative items in response to a cursor hovering over the illustrated item.

28. A method as recited in claim 5, further comprising tracking a number of times that users of the merchant website: (1) select the hyperlink to the associated page, or (2) select the hyperlink to the associated page and purchase the illustrated item.

29. A method as recited in claim 5, further comprising:
tracking a number of times that users of the merchant website: (1) select the hyperlink to the associated page, or (2) select the hyperlink to the associated page and purchase the illustrated item; and
compensating, based on the tracking: (1) the user that associated the hyperlink to the associated page with the illustrated item, or (2) a user that uploaded the image.

30. One or more computing devices comprising:
one or more processors; and
one or more computer-readable media storing computer-executable instructions that, when executed by the one or more processors, cause the one or more processors to perform acts comprising:
causing display of an image that illustrates multiple items found within in an electronic catalog;
associating a first item in the image with a link to a page that is associated with the first item in the electronic catalog; and
associating a second item in the image with a link to a page that is associated with the second item in the electronic catalog.

31. One or more computing devices as recited in claim 30, wherein the page that is associated with the first item is an item detail page of the first item.

32. One or more computing devices as recited in claim 30, wherein the page that is associated with the first item is an item detail page for a third item that serves an as alternative to the first item.

33. One or more computing devices as recited in claim 30, wherein a first website displays the image that illustrates the multiple items, and wherein a second website hosts the page that is associated with the first item.

34. One or more computing devices as recited in claim 30, wherein the associating of the first item is effective to display metadata pulled in from the page that is associated with the first item in response to a cursor hovering over the first item.

35. One or more computing devices as recited in claim 30, wherein:
the associating of the first item comprises associating an area of the image that approximately frames the first item with the link to the page that it associated with the first item in the electronic catalog; and
the associating of the second item comprises associating an area of the image that approximately frames the second item with the link to the page that it associated with the second item in the electronic catalog.

36. One or more computing devices as recited in claim 30, further comprising associating a user-generated annotation with the first item or the second item.

37. One or more computing devices as recited in claim 30, wherein the image is displayed on a website, and further comprising presenting a user interface to a user of the website to enable the user to search the electronic catalog for the first item to associate the illustrated first item with a link to the page that it associated with the first item in the electronic catalog.

38. A server system comprising:
one or more processors;
a memory, accessible by the one or more processors;
an item manager stored in the memory and executable on the one or more processors to maintain a link to page that is associated with an item found within an item catalog; and
a link association tool stored in the memory and executable on the one or more processors to enable a user of a website to upload, onto the website, a media file that visually represents the item found within the item catalog and associate the visually-represented item with a hyperlink to the page that is associated with the item.

39. A server system as recited in claim 38, further comprising:
   a search tool to enable the user to search for the visually-represented item in the item catalog to associate the visually-represented item with the hyperlink; and
   an alternative item tool to enable the user or other users of the website to search the item catalog for items to serve as alternatives to the visually-represented item.

40. A server system as recited in claim 38, further comprising a comment tool to enable the user or other users of the website to comment on the visually-represented item.

41. A server system as recited in claim 38, further comprising an alternative item generator to determine characteristics of the visually-represented item and, with the determined characteristics, associate the visually-represented item with items to serve as alternatives to the illustrated item.

42. A graphical user interface to be rendered on a computing device, comprising:
   a first area to display an image that illustrates at least one item within an electronic catalog and having an associated page, wherein an area of the image that approximately frames the illustrated item is associated, by a user of the computing device, with a hyperlink to the associated page; and
   a second area to enable the user of the computing device to annotate the displayed image.

43. A graphical user interface as recited in claim 42, wherein the associated page is an item detail page for the at least one item.

44. A graphical user interface as recited in claim 42, wherein a first website provides the first area and the second area, and wherein a second website hosts the associated page.

45. A graphical user interface as recited in claim 42, wherein the at least one item is a first item, the associated page is a first associated page, and the image also illustrates a second item having a an associated page, and wherein the second area enables the user to associate the illustrated second item with a hyperlink to the associated page for the second item.

46. A graphical user interface as recited in claim 42, wherein the second area enables the user to comment on the illustrated item or the illustrated item's association with the hyperlink.

47. A graphical user interface as recited in claim 42, wherein the image comprises a digital photograph that the user has uploaded to a website.

48. A graphical user interface as recited in claim 42, further comprising a third area to list each item illustrated in the image that has been associated with a hyperlink to a respective associated page.

49. A graphical user interface as recited in claim 42, wherein the image comprises a digital photograph that the user has uploaded to a website, and further comprising a third area to enable the user to describe the image or display a digital photograph of the user.

50. A graphical user interface as recited in claim 42, further comprising a third area to display a pop-up box in response to a cursor hovering over the illustrated item, the pop-up box containing the hyperlink to the associated page.

51. A graphical user interface as recited in claim 42, further comprising a third area to display a pop-up box in response to a cursor hovering over the illustrated item, the pop-up box containing a comment on the item provided by the user or a user of another computing device.

52. A graphical user interface as recited in claim 42, further comprising a third area to display a pop-up box in response to a cursor hovering over the illustrated item, the pop-up box containing metadata about the illustrated item that has been pulled in from the associated page.

53. A graphical user interface as recited in claim 42, further comprising a third area to display a pop-up box in response to a cursor hovering over the illustrated item, the pop-up box containing a link to enable the user to suggest items to serve as alternatives to the illustrated items, wherein selection of the link allows the user to search the electronic catalog for the alternative items.

54. A graphical user interface as recited in claim 42, further comprising a third area to display a pop-up box in response to a cursor hovering over the illustrated item, the pop-up box containing items or a link to items that have been suggested as alternatives to the illustrated items.

55. A method for implementing an electronic catalog, comprising:
   under control of one or more computing systems configured with executable instructions,
   associating, by the one or more computing systems, a particular item in the electronic catalog with multiple customer-annotated catalog pages that each include an image that illustrates the particular item;
   receiving, at the one or more computing systems, a request for a page that is associated with the particular item within the electronic catalog; and
   serving, by the one or more computing systems, the page that is associated with the particular item responsive to the receiving of the request, the served associated page identifying the multiple customer-annotated catalog pages that each include an image that illustrates the particular item.

56. A method as recited in claim 55, further comprising:
   detecting a cursor hovering over an identification of one of the multiple customer-annotated catalog pages; and
   displaying metadata associated with items illustrated in the one customer-annotated catalog page responsive to the detecting.

57. A method as recited in claim 55, further comprising:
   detecting a cursor hovering over an identification of one of the multiple customer-annotated catalog pages; and
   displaying a hyperlink to the page that is associated with the particular item responsive to the detecting.

58. A method as recited in claim 55, further comprising:
   detecting a cursor hovering over an identification of one of the multiple customer-annotated catalog pages; and
   responsive to the detecting, listing each item illustrated in the one customer-annotated catalog page and having been associated with a hyperlink to a respective associated page.

* * * * *